United States Patent [19]
Patel

[11] Patent Number: 5,602,667
[45] Date of Patent: Feb. 11, 1997

[54] EXTENDED DISTANCE FIBER OPTIC INTERFACE

[75] Inventor: Narottam N. Patel, New Brighton, Minn.

[73] Assignee: Unisys Corporation, Blue Bell, Pa.

[21] Appl. No.: 527,743

[22] Filed: Sep. 13, 1995

Related U.S. Application Data

[63] Continuation of Ser. No. 958,148, Oct. 7, 1992, abandoned.

[51] Int. Cl.⁶ .............................. H04B 10/18; H04J 14/08
[52] U.S. Cl. ........................ 359/161; 359/140; 359/159; 359/173
[58] Field of Search ................................ 359/135–138, 359/140, 158, 159, 161, 173

[56] References Cited

U.S. PATENT DOCUMENTS

| | | | |
|---|---|---|---|
| 4,287,606 | 9/1981 | Lutes | 359/161 |
| 4,554,673 | 11/1985 | Stevens | 375/118 |
| 4,654,844 | 3/1987 | Mandello | 370/32 |
| 4,723,310 | 2/1988 | DeCorlieu | 359/161 |
| 4,727,600 | 2/1988 | Arakian | 359/175 |
| 4,809,257 | 2/1989 | Gantenbein | 359/172 |
| 4,812,842 | 3/1989 | Bagerlein | 359/172 |
| 4,941,207 | 7/1990 | Maeda | 359/172 |
| 4,962,986 | 10/1990 | Hompel | 359/173 |
| 5,099,346 | 3/1992 | Lee et al. | 359/118 |
| 5,119,226 | 6/1992 | Allen | 359/172 |
| 5,170,472 | 12/1992 | Cwiakala | 395/275 |
| 5,227,908 | 7/1993 | Henmi | 359/173 |
| 5,237,567 | 8/1993 | Nay | 370/85.1 |
| 5,287,212 | 2/1994 | Cox | 359/173 |
| 5,299,044 | 3/1994 | Mosch | 359/110 |
| 5,313,323 | 5/1994 | Patel | 359/115 |
| 5,321,542 | 6/1994 | Freitas | 359/172 |
| 5,369,518 | 11/1994 | Aslami | 359/173 |

FOREIGN PATENT DOCUMENTS

| | | | |
|---|---|---|---|
| 0275231 | 11/1988 | Japan | 359/172 |

OTHER PUBLICATIONS

"A Microprocessor Monitored Fiber Optic Data Link", J. Enstn Electronics & Telecom. Engrs., vol. 27, No. 7, 1981.

ANSI/IEEE Std. 802.3, "Information technology—Local and metropolitan area networks—Part 3:", Carrier Sense Multiple Access with Collision Detection (CSMA/CD) Access Method and Physical Layer Specifications, 1993 Edition, pp. 115–116, 130–134, 137, 141, 178–181.

IEEE Std. 896.2, "Standard for Futurebus+—Physical Layer and Profile Specification", Apr. 24, 1992, pp. 211–213.

FIPS PUB 60–2, Federal Information Processing Standards Publication, "I/O Channel Interface", Jul. 29, 1983, pp. 60–61, 64–65.

Sperry–Univac Specification, "I/O Interface: Eight Bit Compatible", D. M. Davies, Dec. 15, 1982.

Weik, "Communications Standard Dictionary" 1983, pp. 176 and 432.

Helliwell, "Window LANs: Coming to an Office Near You?", PC Week/Hardware vol. 8, #29 p. 20, Jul. 24, 1989.

Lewis, "Networking without the Wires", The New York Times, Aug. 20, 1989.

(List continued on next page.)

*Primary Examiner*—Leslie Pascal
*Attorney, Agent, or Firm*—Nawrocki, Rooney & Sivertson, P.A.

[57] ABSTRACT

A device controller for coupling various peripheral devices to a host computer while compensating for distances of up to 10 kilometers. The basic interface medium is fiber optics. The chosen protocol may be functionally equivalent to an existing electrical interface standard or may comply with an interface standard designed specifically for fiber optic input/output communication. The time delays associated with distances of from 500 feet to 10 kilometers are automatically provided by manually switching to the maximum distance mode. An embedded RISC provides the basic logic for the device controller. Further efficiencies are provided by permitting Futurebus+ and disk storage subsystem data exchanges without involvement by the host computer.

28 Claims, 36 Drawing Sheets

OTHER PUBLICATIONS

Clark, "Jungle Escape", San Francisco Chronicle, Jul. 13, 1989.

Nakata, "In House Wireless Communication System Using Infrared Radiation", North Holland:Elsevier Science Publishers BV, pp. 333–337, Nov. 1985.

Chu, "High Speed Infrared Local Wireless Communication", IEEE Communications, vol. 25 #8, pp. 4–10, Aug. 1987.

Costlon, "DG sets up RAID unit", Electronics Engineering Times Sep. 21, 1992.

EXTENDED DISTANCE FIBER OPTIC INTERFACE

CROSS REFERENCE TO CO-PENDING APPLICATIONS

The present application is a continuation of U.S. patent application Ser. No. 07/958,148, now abandoned, filed Oct. 7, 1992, entitled "EXTENDED DISTANCE FIBER OPTIC INTERFACE", to the same assignee, and is related to commonly assigned, co-pending U.S. patent application Ser. No. 07/912,972 filed Jul. 10, 1992 and entitled "Fiber Optic Bus and Tag Adapter for Block Multiplexer Channel", incorporated herein by reference.

BACKGROUND OF THE INVENTION

1. Field of the Invention

The present invention generally relates to data transfer techniques for data processing systems and more particularly relates to data transfer over extended distances.

2. Description of the Prior Art

It has been known for some time to transfer digital data between peripheral equipments and host computers. The earliest and most popular medium for such transfers is electrical energy, which flows within a circuit including portions of the host computer, peripheral devices, and interconnecting electrical cables. These data transfers may be serial in nature, which transmit one data bit at a time, or parallel, in which a number of data bits are transmitted simultaneously.

For a given switching speed of an individual electrical circuit, the parallel approach is inherently faster because it transfers multiple data bits simultaneously. This has meant that serial transmissions have tended to be limited to low data rate information paths or to long distances wherein the cost for parallel transmission is prohibitively expensive. Therefore, most modern day data transfers between host computers and associated peripheral devices utilize parallel electrical transmission. A typical protocol for such transmissions is the popular Block Multiplexer Channel (i.e. BMC) utilized by Unisys Corporation. This highly efficient approach transfers data as parallel bytes (along with parity bits) over a first parallel cable and control signals over a second parallel cable. Because these two cables transfer data and control signals only in one direction, a second pair of cables is usually needed for transfers in the opposite direction. The technique provides an effective transfer rate in each direction of nearly 4.5 MB/sec.

A second medium which is gaining popularity for data transmission is fiber optics. In this approach, the digital data is converted to pulses of light which are transferred over a special light conducting fiber optic cable. Because this transmission medium does not experience the same distributed capacitance which delays electrical transmissions, higher data rates can generally be achieved for a given transmission energy. In fact the data transmission rates tend to be sufficiently high, that serial fiber optic transmissions can be utilized to replace parallel electrical transmissions for many host computer to peripheral device transfers.

Regardless of the transmission medium, particular difficulty is experienced with transmission over extended distances. This occurs because of the finite additional time per unit of distance required to transfer the signal. For most practical standardized interfaces, such as Unisys BMC referenced above, a maximum practical distance is specified (e.g. 500 feet). Such a standard maximum length permits defining efficient software and hardware applicable to the majority of interfaces, which transfer data over short distance (i.e. less than 500 feet). A different or supplementary protocol is defined for extended distances (i.e. in excess of 500 feet). This second protocol accommodates the delays associated with the longer transfer time.

A second characteristic of long distance data transfer is signal loss as a function of distance. Whereas this factor also occurs with optical transmission, it is clearly most pronounced with the electrical medium. One component of this electrical loss is purely resistive in nature. Additional driver voltage may be used to compensate. However, a second reactive component (usually capacitive) tends to complicate the problem. The result is that extended distance electrical data interfaces usually employ different and much higher power circuitry in an attempt to lessen the time delays and adverse signal to noise ratios. These non-standard protocols coupled with the non-standard hardware and software present system integration, power dissipation, and reliability problems.

At the corresponding data rates using the optical medium and current fiber optic techniques, extended distance transmission produces time delays over and above shorter distance transmission. However, the corresponding signal losses are not nearly as severe as with the electrical medium. Therefore, systems employing optical transmission techniques up to several miles need compensate only for the additional time delays but need not be concerning with signal losses. However, prior art systems provide this compensation only within the framework of protocols designed expressly for optical transmission. This produces incompatibility with existing hardware, software, and interface standards.

SUMMARY OF THE INVENTION

The present invention overcomes the disadvantages of the prior art systems by providing a fiber optic data transmission interface technique, which may transfer data over extended distances, yet maintain functional compatibility with existing interface standards for both electrical and optical data transmission. These advantages are provided through the use of a standardized controller along with modularized interfaces for the various existing and new interface protocols.

The standardized controller incorporates a microprogrammed, high performance, Reduced Instruction Set Computer (RISC). The architecture of the present system will readily accommodate RISC clock rates up to 50 MHz. Through the use of buffering, the standardized controller with its embedded RISC can readily compensate for the delays associated with extended distance data transmission. In this way, channel extender usage is made transparent to user hardware and software.

The modularized interfaces contain all of the protocol specific logic required to transfer data in the corresponding format. Though the preferred embodiment of the present invention utilizes Unisys BMC and Futurebus+ (IEEE standard for optical medium), clearly other existing and new protocols are equally applicable.

For the BMC standard interface, for example, a fiber optic protocol is established which transparently appears as electrical transmission to the user (see also the above referenced, commonly assigned U.S. patent application). The single chip modularized interface operates in a minimum mode (MIN) permitting transfers up to 500 feet, whereas switching to the maximum mode (MAX) accommodates transmission and reception up to 10 kilometers. The standardized controller containing the embedded RISC automatically compensates for the differences in delay times between these two modes to render them transparent to the user of the data.

Integration of the standardized controller with Futurebus+ and storage controller subsystems ensures that data transfers amongst peripheral device subsystems may be accomplished without attention from the host computer. Input spooling and processing of spooled output data are typical applications.

One object of the present invention is to provide a Futurebus+based single circuit board storage controller including SCSI RAIDS Array Controller and BMC extender controller using fiber optics. The modified BMC protocol provides smooth upward migration and downward compatibility.

A second objective of the present invention is to provide a unique architecture for a high performance storage controller. A further objective is to introduce an improved and scalable storage controller. A yet further objective of the present invention is to provide a novel input/output controller system which can be interfaced easily to an existing network environment using fiber optics as the transmission medium, with existing and yet to be defined interface protocols.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAIL DESCRIPTION OF THE PREFERRED EMBODIMENTS

Figure 1:
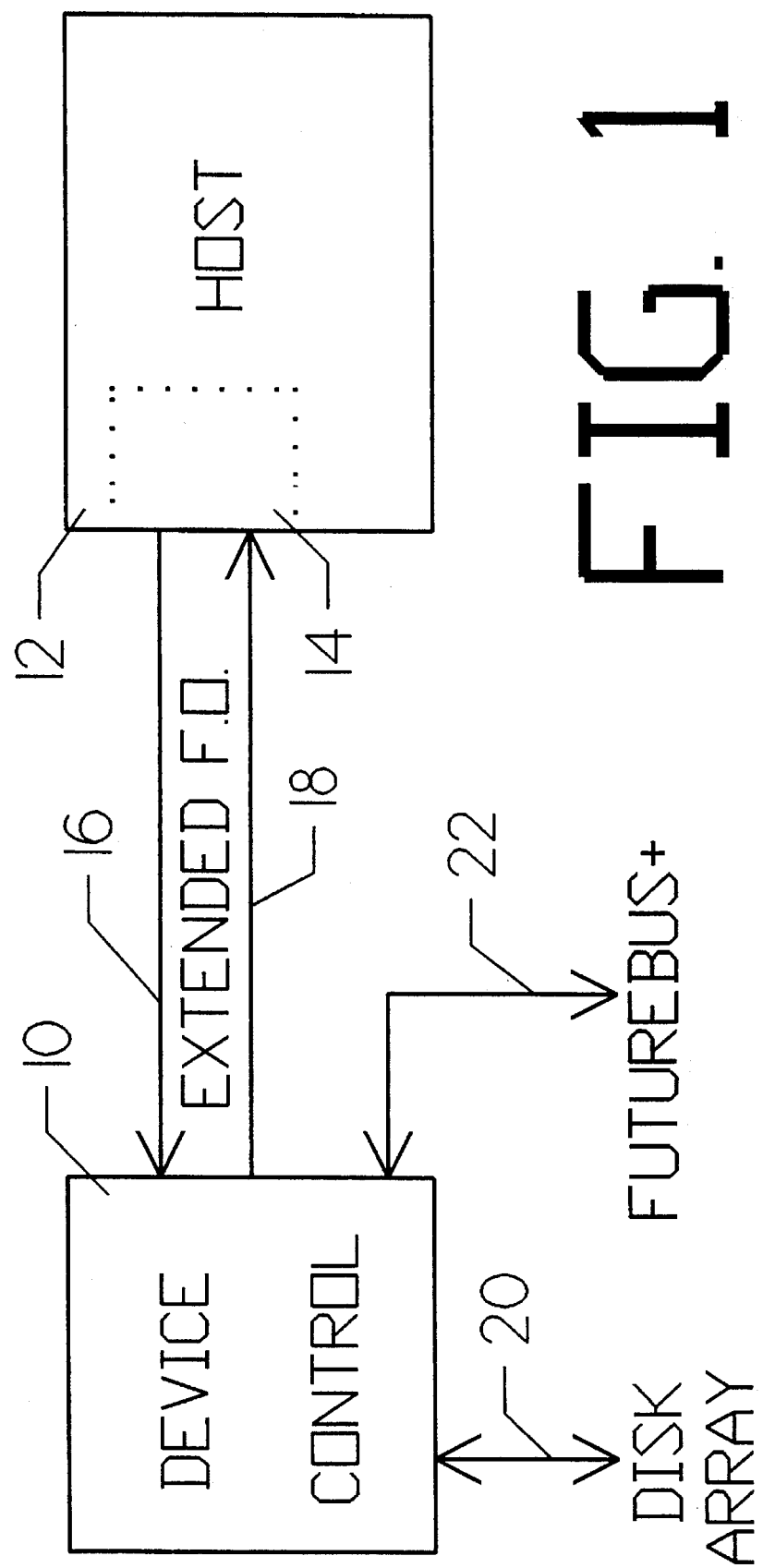
FIG. 1 is a conceptualized diagram of the present invention.

FIG. 1 is an overall block diagram of a system employing the present invention. In accordance with this preferred embodiment, fiber optic modified BMC and Futurebus+ interface standards are used. However, those of skill in the art will be readily able to adapt the techniques found herein to yet other existing and new interface standards.

Device controller 10 of the present invention communicates with host computer 12 over fiber optic cables 16 and 18 using a protocol which is compatible with the existing BMC interface standard (see also the above referenced U.S. patent application). As shown in the diagram, fiber optic cables 16 and 18 may be either of minimum length (i.e. 500 feet or less) or may be extended to as much as 10 kilometers. Though device controller 10 and corresponding interface 12 must be switched to maximum mode (MAX) to accommodate the extended distance interface, this relatively long distance is otherwise transparent to the remaining hardware and software of the system as explained below.

The remaining interfaces of device controller 10 include the IEEE standard Futurebus+ 22, which may communicate with any number of different compatible peripherals, and disk array subsystem interface 20, which is explained in more detail below. In addition to the advantages of the present invention apparent in the interface between device controller 10 and host computer 12, considerable advantages accrue to the use of these other interfaces as is explained in more detail below.

Figure 2:
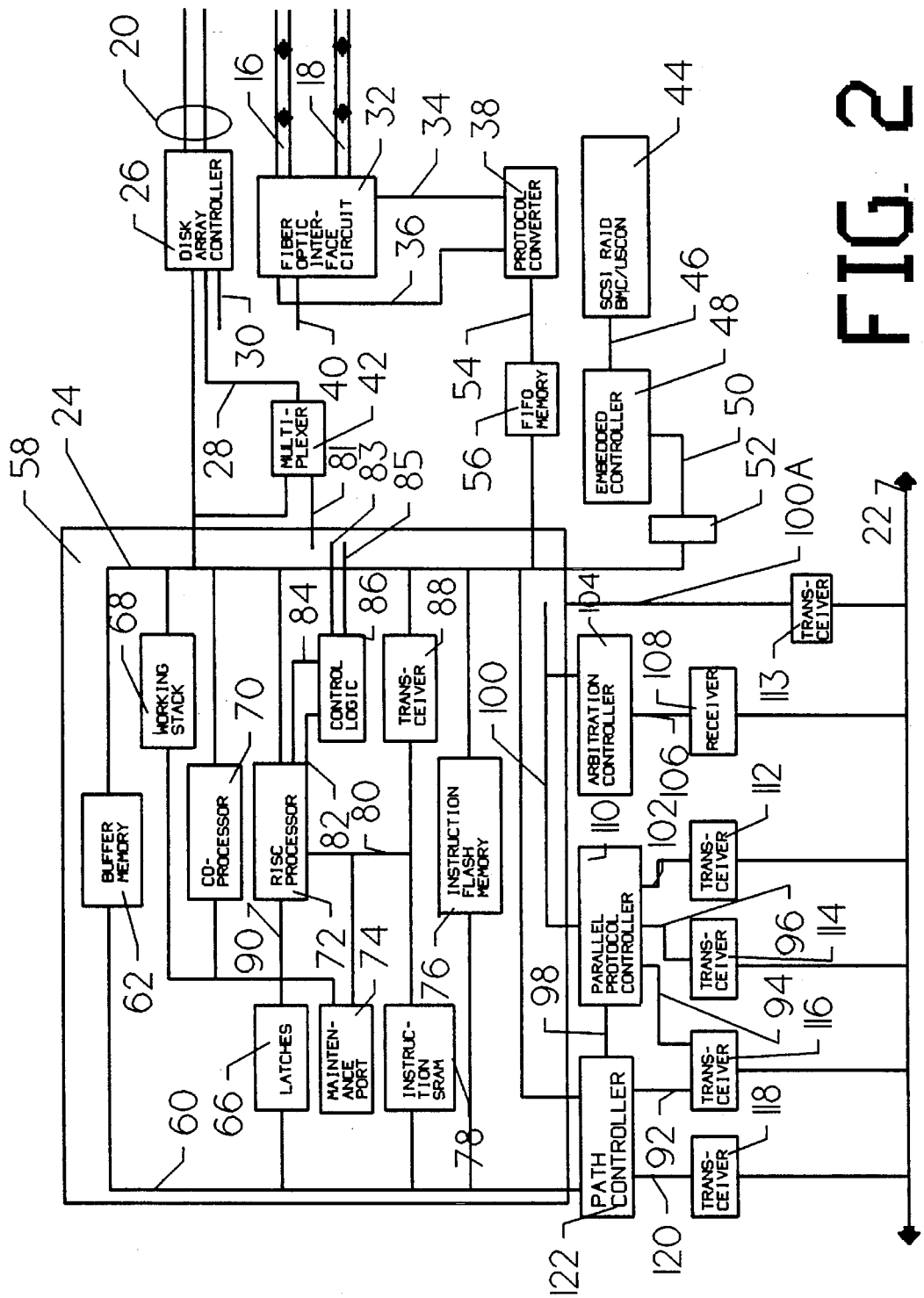
FIG. 2 is a basic block diagram of the device controller.

FIG. 2 is a detailed block diagram of device controller 10. Embedded RISC 58 is a microprogrammed device which regulates all of the functions of device controller 10. It also provides certain interface to interface transfers without interaction with host computer 12.

Embedded processor 58 employs RISC processor 72 which is preferably a commercially available AM29000 device. Arithmetic processor 72 is electrically coupled as shown herein and is programmed in accordance with the manufacturers suggestions and as further provided herein to perform the desired functions.

Instruction flash memory 76 provides the microcode stream to instruction SRAM 78 via transceivers 88 and busses 80 and 24 at the time of power up. This permits device controller 10 to be down loaded with its unique characteristics because instruction flash memory 76 is a writable EPROM. During operation, instructions are provided to arithmetic processor 72 from instruction SRAM 78 via bus 24. Addressing for instruction flash memory 76 and instruction SRAM is provided via bus 60 which is coupled to bus 90 by high speed address latches 66. Bus 90 also provides addressing information to arithmetic co-processor 70 and working stack 68.

Control logic 86 provides access, arbitration, and reset controls to RISC processor 72 via lines 84, to the Futurebus+ interface circuitry via lines 82 and 100, to the disk subsystem via lines 83, and to the BMC interface circuitry via lines 85. The nature of these control lines is discussed in greater detail below.

Buffer memory 62 is coupled between busses 60 and 24. It is used to temporarily store data in transit between two of the interfaces of device controller 10. Working stack 68, on the other hand, provides the temporary storage for embedded controller 58. Maintenance port 74 provides internal access to embedded controller 58 for maintenance purposes.

Bus 24 is the main internal 36 bit (i.e. 32 data bits and four parity bits) parallel data bus for device controller 10, which makes internal transfers of the external interface data. It is designed to operate at a bandwidth of 100 MB/sec. The remaining internal busses of embedded controller 58 (i.e. bus 90, bus 80, and bus 60) do not include parity for address/data and therefore transfer only 32 parallel address/data bits without parity.

Disk array controller 26 is connected as a RAID 5 configuration. The RAID 5 disk controller 26 interfaces directly with bus 24. The multiplexer 42 provides address/data lines to the SIOP of the disk array controller 26. This is mainly used for device level diagnostic purposes. The multiplexer 42 has data bus 24 and portion 64 as input lines. Transceivers 113 provides the Futurebus+ 22 interface for the bus request (BR) and bus grant (GR) control signals on lines 100A.

The Futurebus+ address and data interface is bidirectional. The data bus 24 and address bus 60 is through data path controller 122. The data path receives or sends multiplexed data and address bus 120 to the Futurebus+ 22 via transceivers 118. Status information uses lines 92 and drivers/receivers 116. Arbitration of Futurebus+ 22 utilizes local arbitration controller 104, lines 106, and drivers/receivers 108.

Local Futurebus+ control is provided by parallel protocol controller 110 via lines 94 for status, via lines 96 and drivers/receivers 114 for commands, and via lines 102 and drivers/receivers 108 for synchronization. The interface between the parallel protocol controller 110 and data path controller 122 is provided via line 98. As explained in more detail below, Futurebus+ 22 is maintained in accordance with the applicable IEEE 896.1 standard.

As explained above (see also FIG. 1), communication between device controller 10 and host computer 12 is via fiber optic cables 16 and 18 using a slightly modified BMC protocol. Fiber optic interface circuit 32 converts optical signals received via fiber optic cable 16 to electrical signals, which are placed on bus 36. Similarly it converts electrical signals to be transmitted from bus 34 to optical signals, which are coupled to fiber optic cable 18. Protocol controller 38 provides sequencing which corresponds to the BMC transfer protocol in the preferred mode. However, the ESCON protocol developed by IBM and yet other protocols may also be employed within the scope of the present invention. Bi-directional FIFO memory 56 provides a data buffering stage for the channel extender BMC and the RISC processor as envisioned by the asynchronous nature of data transfer between the host and the device controller.

In addition to the preferred embodiment interfaces, additional embedded controllers 48 may be coupled via on board expansion connector FBX. This greatly reduces the components and allows use of Futurebus+ CSR protocols on the same module platform. Embedded controllers 48 and SCSI RAID and BMC/USCON 44 comprise the scalable RISC AM29000 based embedded storage controller, excluding the Futurebus+ interface.

Figure 3:
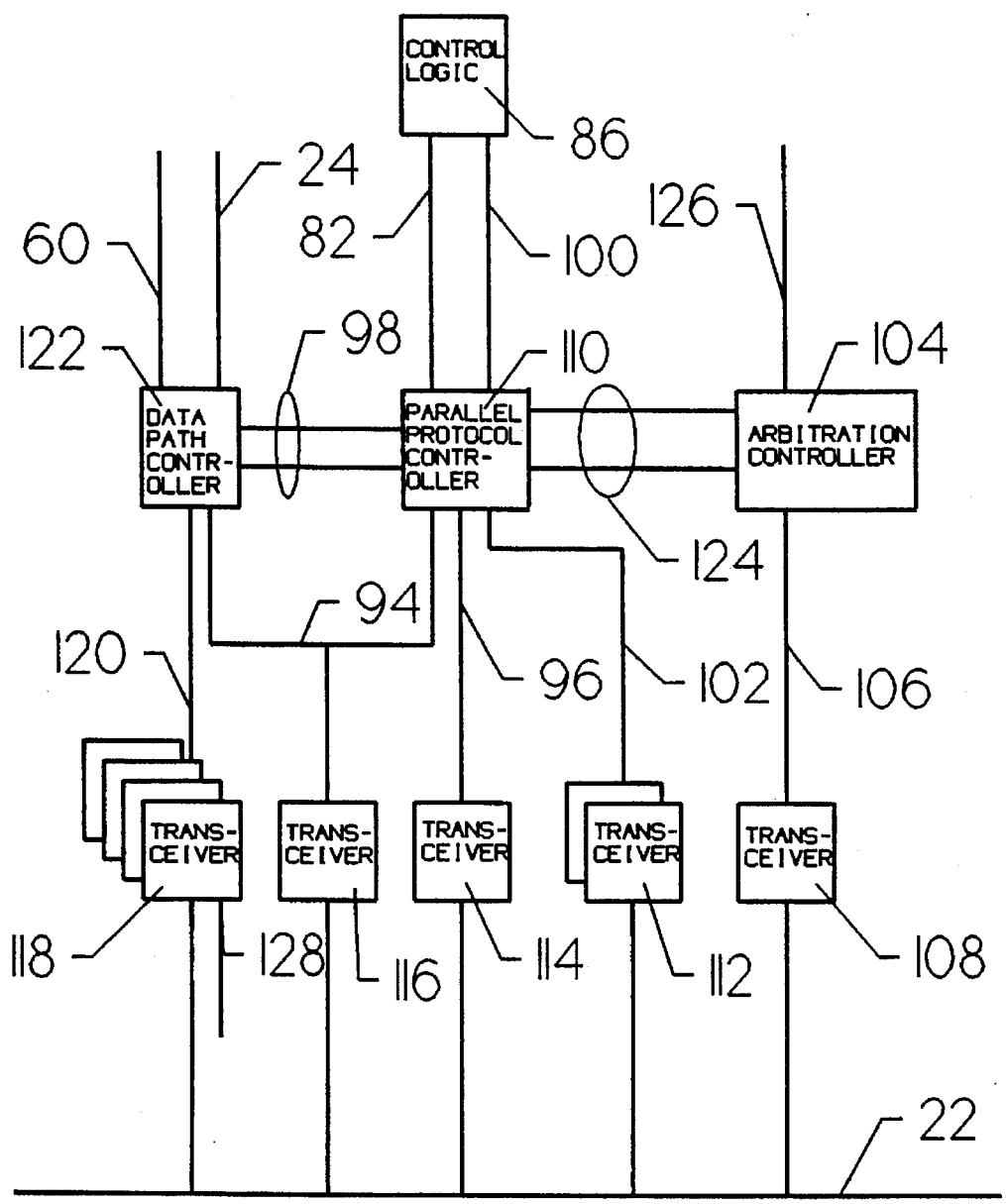
FIG. 3 is a block diagram of the elements of the Futurebus+ interface.

FIG. 3 is a block diagram showing the Futurebus+ interface circuitry in greater detail. Bus 22 represents the Futurebus+ bus. The multiplexed address/data lines are interfaced by the bipolar transistor logic (BTL) transceivers 118. The direction of the data is controlled by the control signal T_RW* by line 128. Lines 120 provide the TTL level address/data lines to the data path controller 122. This controller provides de-multiplied or multiplexed data and address information via busses 60 and 24, respectively. The BTL handshake transceiver 116 can transfer up to eight bits of status information bidirectionally on line 94.

Data path controller 122 is interfaced to parallel protocol controller 110 via lines 98. Lines 96 transfer the command information between Futurebus+ 22 and parallel protocol controller 110 using BTL transceiver 114. Futurebus+ synchronization information for addressing and data are similarly coupled to parallel protocol controller 110 using lines 102 and BTL handshake transceiver 112. Communication with Futurebus+ arbitration controller is via lines 124.

Use of Futurebus+ 22 by device controller 10 is arbitrated by Futurebus+ arbitration controller 104 and on board state machine and controls 86. Communication with Futurebus+ 22 arbitration signal lines is via drivers/receivers 108 and lines 106. Line 126 provides the means to interrupt RISC processor 72. The arbitration process and compelled/packet mode transactions are in accordance with IEEE Standard 896.1.

Figure 4:
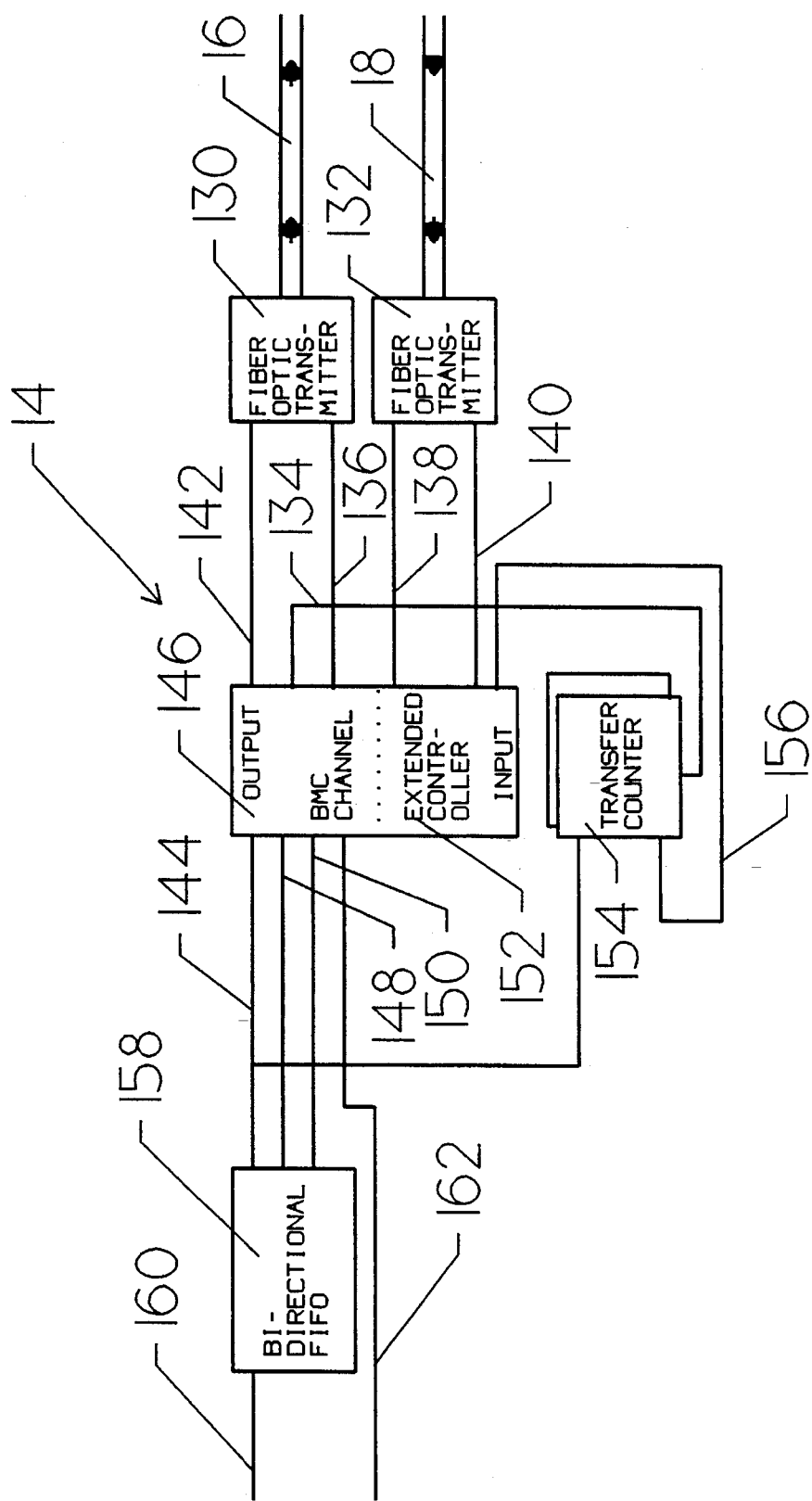
FIG. 4 is a block diagram of the elements of the Host Computer BMC interface employing the optical medium.

FIG. 4 is a block diagram of the fiber optic interface circuitry 14 of host computer 12. Fiber optic cable 16 transfers serial optical signals to device controller 10. Similarly, fiber optic cable 18 receives serial optical signals from device controller 10. Fiber optic transmitter 130 converts the data and tag bits received via lines 142 into a modulated light beam as strobed by the timing signal on line 136. Similarly, fiber optic receiver 132 converts the received light beam into data and tag bits impressed on lines 138 under control of the timing signals on line 140.

Output portion 146 of the BMC channel extender controller provides bus/tag multiplexed information over the lines 142. The bus and tag information is sequenced in accordance with the modified FIFPS60 protocols. Input portion 152 of the BMC channel extender controller receives multiplexed bus/tag information over the lines 138. The bus and tag information is sequenced in accordance with the modified FIFPS60 protocols. Bi-directional FIFO 158 interfaces directly with 36 bit (32 data bits and 4 parity bits) main internal data bus 160. Use of bi-directional FIFO 158 provides an eight bit byte interface 144 to the BMC channel extender controller. Two bytes defining the number of data blocks are loaded into the synchronous transfer counter 154 which generates the end of transfer. The transfer counter is controlled by the sequencer 146 by up/dn line 134. This counter is used both for transmit and receive modes.

Read/write control of bi-directional FIFO 158 is maintained by the BMC channel extender controller via line 148. The corresponding return timing signal is provided on line 150. The system clock signal on line 162 ensures that the input/output functions are synchronized with the internal operation of host computer 10.

Figure 5:
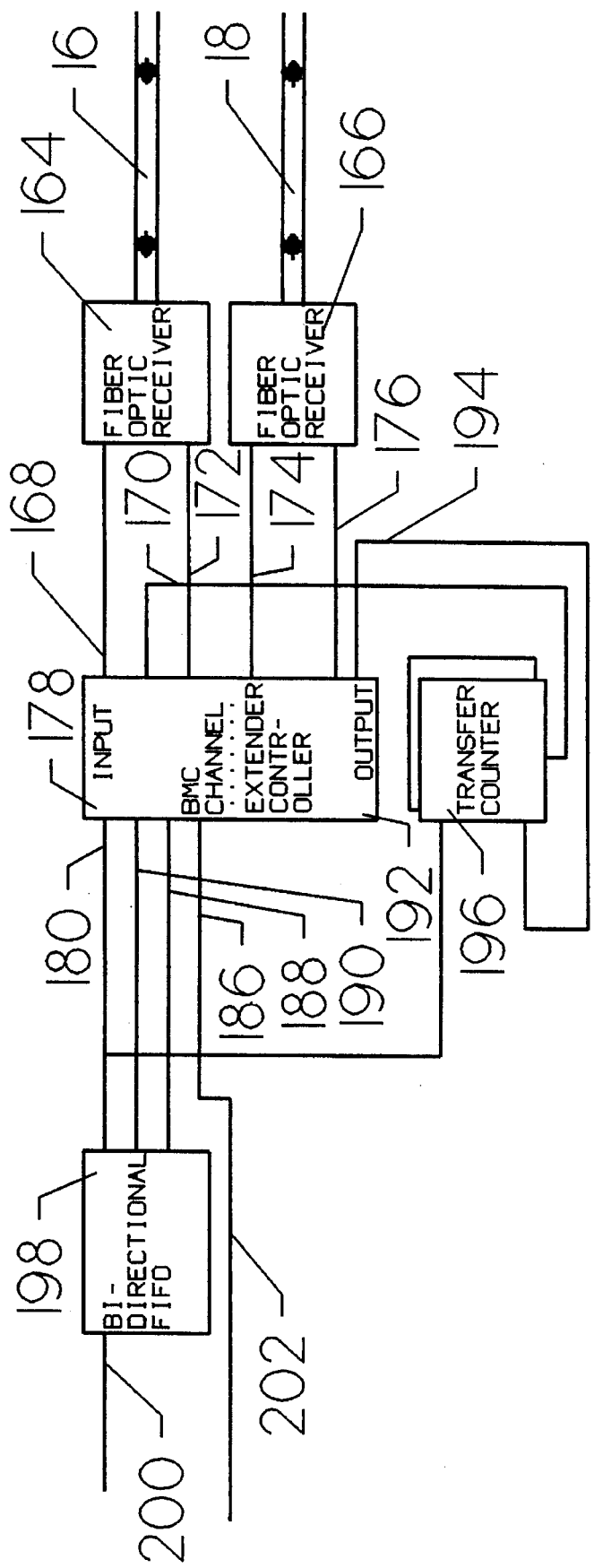
FIG. 5 is a block diagram of the elements of the Device Controller BMC interface employing the optical medium.

FIG. 5 is a block diagram of the corresponding fiber optic interface of device controller 10. Lines 200 correspond to the 36 bit main bus 24 (see also FIG. 2). The system clock signal is supplied via line 202. Bi-directional FIFO buffers the data for both transmission and reception. Each transmission word is broken into eight bit bytes which are transferred over eight bit bus 180 to the BMC channel extender controller 178, 192. Output portion 192 of the BMC channel extender controller provides bus/tag multiplexed information over the lines 174. The bus and tag information are sequenced in accordance with the modified FIFPS60 protocols. The serial bit stream containing both tag and data are done by the FO_TX device 166. The modulated light beam output of optic driver 166 is optically coupled to fiber optic cable 18. Timing of fiber optic transmitter 166 is controlled by the strobe signal supplied on line 176.

The serialized light beam received by fiber optic receiver FO_RCV of 164 from fiber optic cable 16 is converted into an electrical bit stream containing tag and data information. The deserilization into multiplexed busout/tagout information is done by the FO_RX device of 164. Input portion 178 of the BMC channel extender controller receives multiplexed busout/tagout information over the lines 168. These received data are strobed by line 172 coming from the FO_RX device of 164. Bus and tag information are sequenced in accordance with the modified FIFPS60 protocols. The byte data on bus 180 provided by the BMC channel extender are converted into a full word and parity bits by the BiFIFO 198. Two bytes defining number of data blocks are loaded into the synchronous transfer counter 196 which generates the end of transfer signal. The transfer counter is controlled by the sequencer 178 by up/dn line 179. This counter is used both for transmit and receive modes.

The read/write control of the BiFIFO 198 is maintained by the BMC channel extender controller 178 via line 186. The corresponding transmit flag is provided on line 188. The SYSCLK1 on line 162 provides BMC extender controller clock input. Thus complete system synchronization is maintained within device controller 10.

Figure 6:
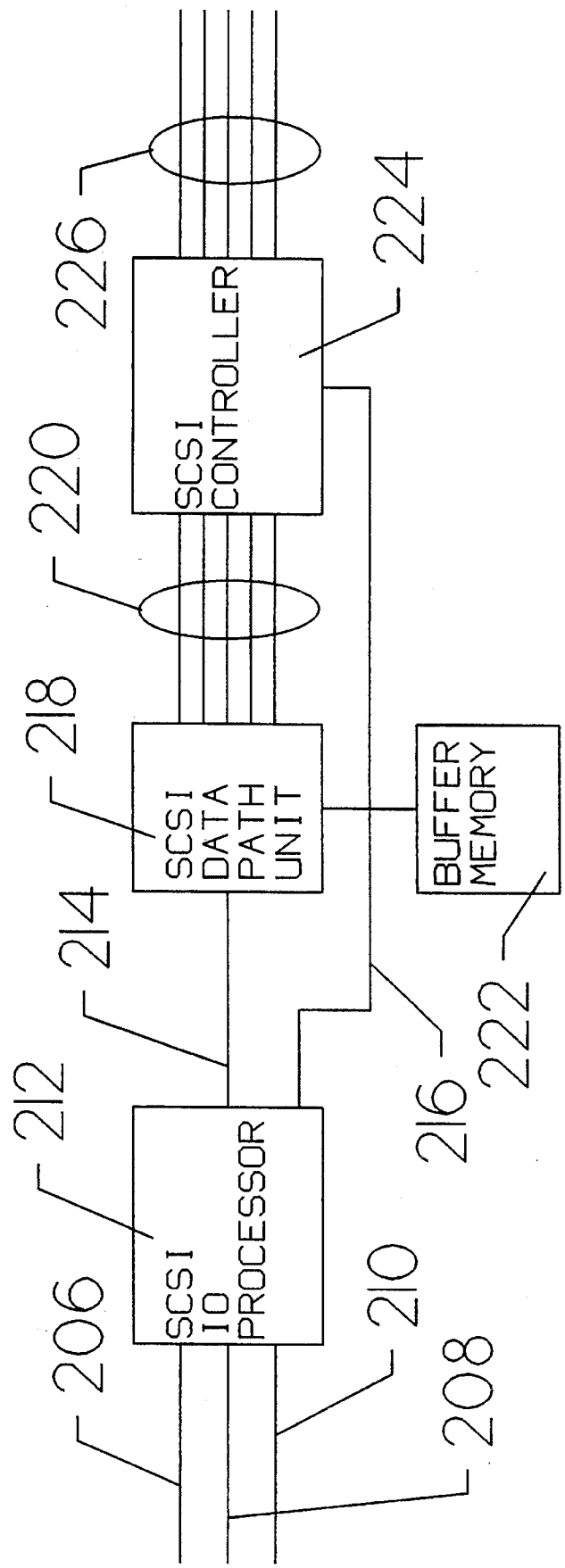
FIG. 6 is a block diagram of the disk subsystem controller.

FIG. 6 is a block diagram of the disk subsystem controller. The RISC processor 72 sends an SCSI command to initiate a transaction, which places the disk subsystem into DMA mode for burst transactions to the SCSI IO Processor (SIOP) 212. This SIOP processor fetches instructions from buffer memory 62 of the RISC processor. Algorithms written in 32-bit SCSI SCRIPTs can control the action of the SCSI and DMA cores. Complex SCSI bus sequences are executed independently of the RISC processor. The RAID array controller is directly coupled to the main data bus 24 and therefore, takes the shortest time for burst mode. The SCSI-2 SIOP 212 goes at its own pace to transfer data on the disk array via data path unit 218 over interface lines 214. Buffer memory 222 provides the disk subsystem with short term storage during read/modify/write operation. SCSI data path unit 218 transfers byte and parity to the five array SCSI controller 224 via bus 220.

As is explained in additional detail below, the disk subsystem provides access to a substantial amount of data. Furthermore, even though this access may be made from host computer 12, it may also involve direct communication with users of Futurebus+ or other additional device controller 48 coupled to main bus 24.

Figure 7:
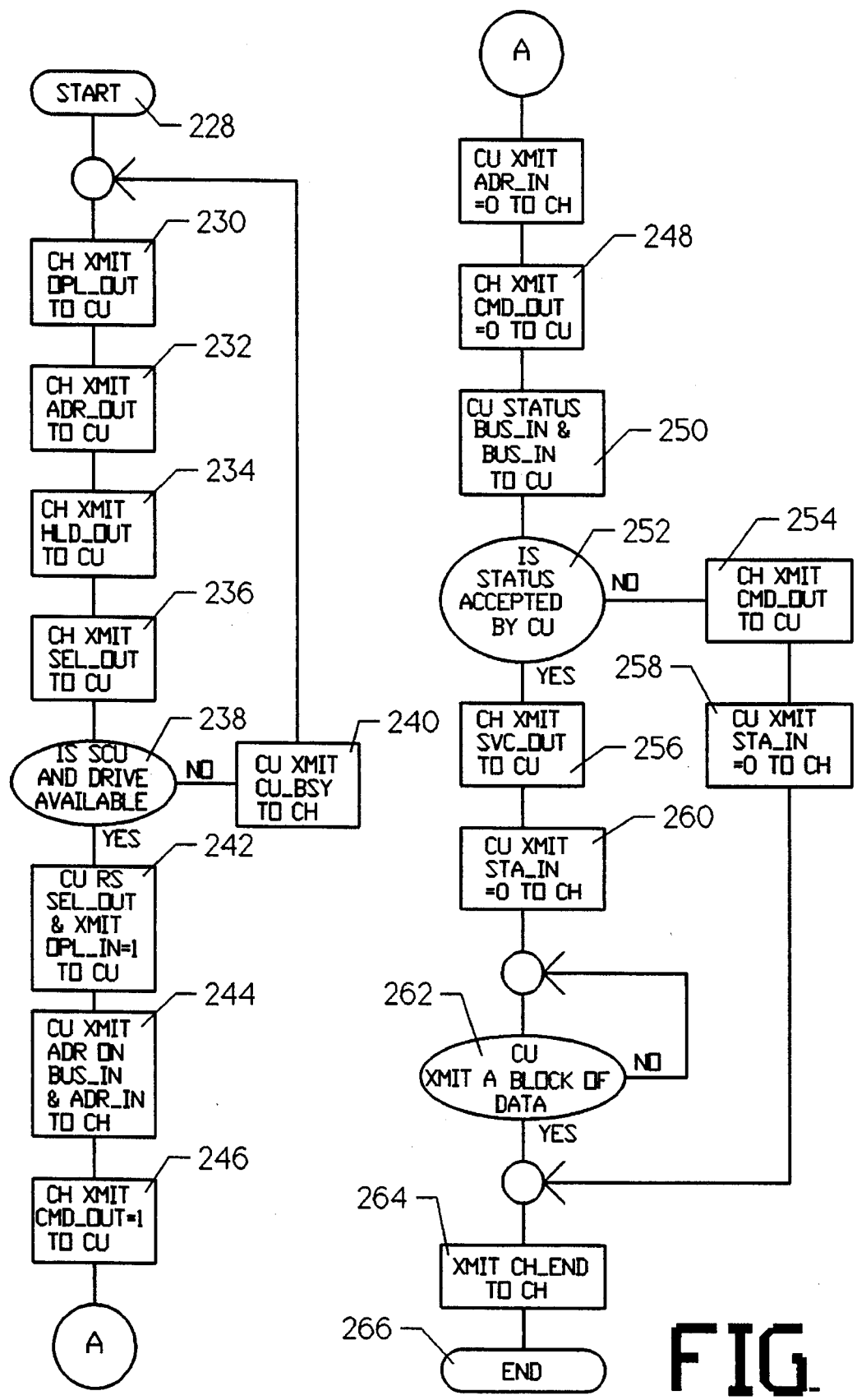
FIG. 7 is a flow chart of the transmission protocol logic for a Host Computer initiated transfer.

FIG. 7 is a flow chart of the logical control of a data transfer initiated by host computer 12. Entry is via element 228. The host BMC places the OPL_OUT, ADR_OUT, HLD_OUT and SEL_OUT sequentially to the device controller 10 via the TD bus 34 (see also FIG. 2) as shown by elements 230, 232, 234, and 236. The element 238 determines whether the addressed device CU is available for communication. If no, element 240 transmits a CU_BSY signal and control is returned to element 230. If the CU is not busy and available for the data transfer, control is given to element 242.

The CU BMC 10 acknowledges the receipt of the CH-initiated request by returning OPL_IN=1 and resetting ADR_OUT at element 242. Also, it transmits its address byte at element 244. In response, the host BMC transmits the actual transfer command byte and CMD_OUT=1 to the CU BMC 10 at element 246. The selected CU BMC transmits ADR_IN=0 signal. The next sequence is to transmit CMD_OUT=0 by the host BMC signaling the end of the command at element 248. The CU BMC transfers the status information by element 250.

If element 252 determines that the status is not accepted, no transfer will occur, and control is given to element 254, which notifies device controller 10 that the status is not acceptable. Element 258 sets the status to zero and gives control to element 264. If element 252 determines that the status is accepted, control is given to element 256 wherein host BMC transmits SVC_OUT=1 tag information for transfer of the requested blocks of data as specified by the CMD_OUT byte. Element 260 sets the status to zero, and element 262 maintains control until the transfer is completed. Following completion of the transfer or failure of the transmission, element 264 returns a transmission completed signal. Exit is via element 266.

Figure 8:
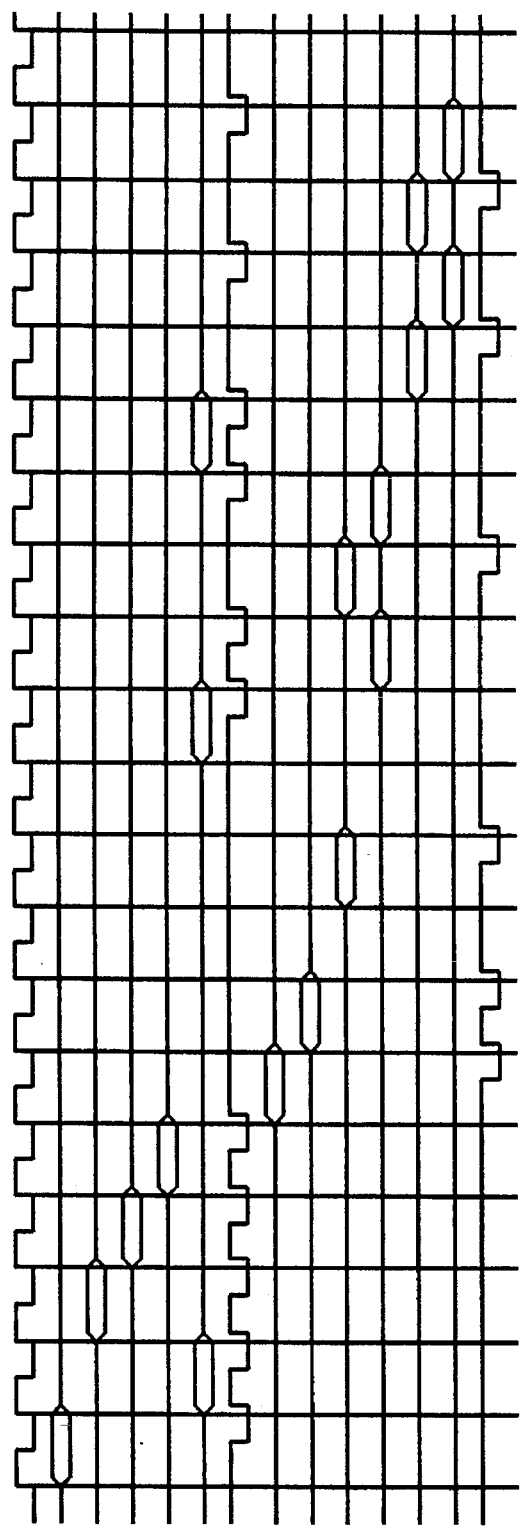
FIG. 8 is a timing diagram for the transfer of FIG. 7.

FIG. 8 is timing diagram 268 showing the relationship of the various signals associated with the transfer shown by the flow chart of FIG. 7. SYSCLK represents the Host BMC controller clock. This is also used by the BMC controller 146 (see also FIG. 4). STB0 represents the strobe used to transmit the busout/tagout data into the FO_TX 130 (see also FIG. 4). When asserted, the valid data are strobed into the device. In a like manner, STB1 is used to load the received busin/tagin data into the BMC controller 146 (see also FIG. 4).

Figure 9:
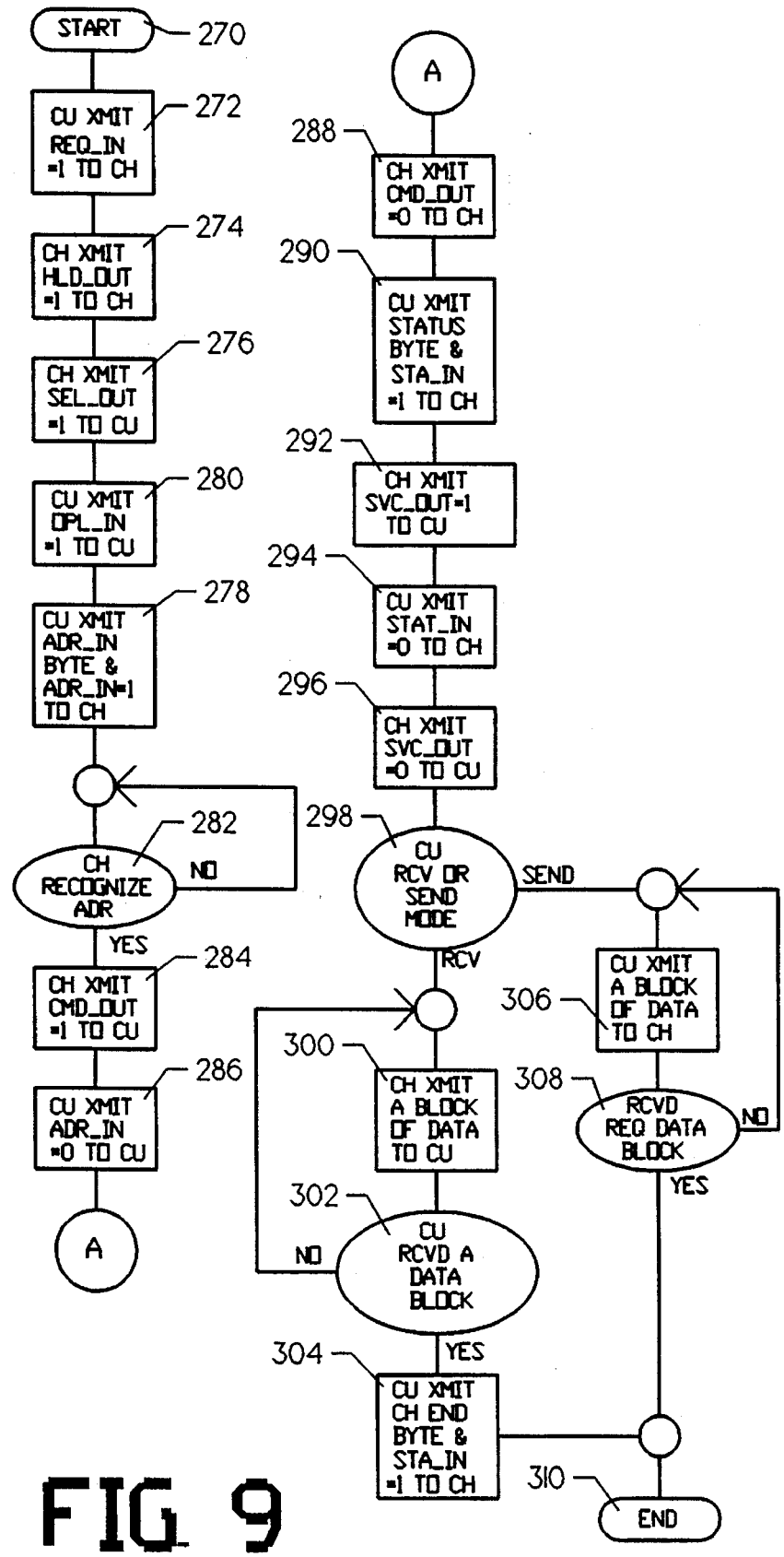
FIG. 9 is a flow chart of the transmission protocol logic for a Device Controller initiated transfer.

FIG. 9 is the flow chart of a data transfer initiated by the device controller 10. Entry is via element 270. Device controller notifies host computer 12 of the initiation of a data transfer by transmitting the REQ_IN signal at element 272. The host BMC transmits HLD_OUT and SEL_OUT sequentially in response to the CU request. When the CU BMC acknowledges the receipt of those signals, it transmits OPL_IN=1 and then its address byte and ADR_IN=1 signals. The host BMC acknowledges the device address and transmits command byte and CMD_OUT=1 to the CU BMC. The CU BMC then transmits ADR_IN=0 to the host BMC. This in turn initiates the host BMC to transmit the CMD_OUT=0 signal. The drop of CMD_OUT signal compels the CU BMC to transfer status byte and STA_IN=1 signal to the host BMC. The CH_BMC in turn transmits SVC_OUT=1. The CU BMC then transmits STA_IN=0 signal to the host BMC. The receipt of this tag signal initiates the host BMC to transmit SVC_OUT=0. This completes the CU initiated sequence.

Element 298 determines whether the data transfer is in send or receive mode as viewed from device controller 10. In send mode, element 306 transmits a block of data. Control is maintained by element 308 until the data block has been received by device controller 10. If not received, control is returned to element 306 to try again. If received, the procedure exits at element 310.

If element 298 determines that device controller 10 is to receive data, element 300 causes host computer 12 to transmit a block of data. Control is maintained by element 302 to ensure that the block of data has been satisfactorily received by device controller 10. If not, control is returned to element 300 to try again. If device controller 10 has correctly received the block of data, it acknowledges at element 304 by transmitting the channel end and status signals. Exit is via element 310.

A short busy selection sequence occurs whenever the host BMC attempts to initiate selection of a CU that is busy with an I/O operation. The CU channel interface hardware will raise the STA_IN=1 line and place the CU_BUSY=1 status byte on the BUS_IN lines. The channel then lowers the SEL_OUT=0 signal, causing the CU to lower the STA_IN=0 signal. This causes the channel to send the ADR_OUT=0 signal. No microcode intervention takes place during the short busy sequence.

An ending sequence can be initiated by either the I/O device BMC or the host BMC byte channel. If the procedure is initiated by the I/O device, then ending status is presented. This signals the end of an operation. The end of an operation can be signaled by using only one ending sequence, assuming that both channel-end and device-end conditions occur together, or by the execution of two ending sequences where channel-end and device-end status are presented separately. If the ending sequence is initiated by the host BMC, the I/O device BMC can still require time to reach the point where the proper ending status information is available. In this case, a second ending sequence is required to complete the entire procedure. If device-end is not presented with channel-end, the device-end is presented when it is available by executing an SCU-initiated sequence.

Figure 10:
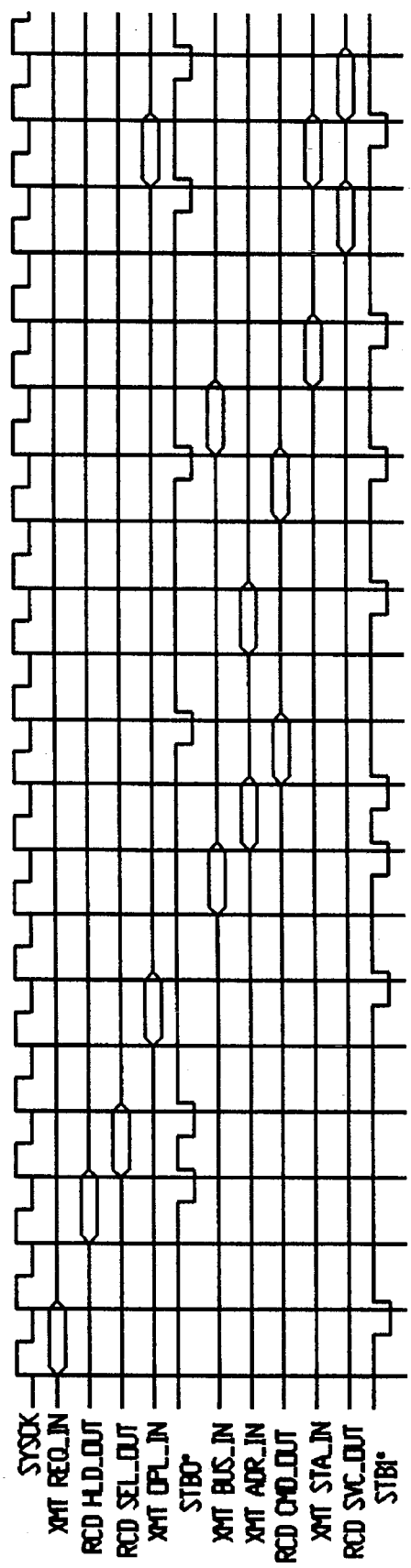
FIG. 10 is a timing diagram for the transfer of FIG. 9.

FIG. 10 is timing diagram 312 showing the operation of the device controller initiated data transfer of FIG. 9. SYSCLK represents the embedded controller 24 main 25 MHz clock. This is also used by the device BMC controller 38 (see also FIG. 2). Referring to FIG. 5, the busin/tagin data are strobed into FO_TX device 164 when STB0 is asserted. This device deserializes the parallel data to transmit over the fiber cable 18. In a like manner, the FO_RX 166 (see also FIG. 5) asserts STB1 to load valid received busout/tagout data over lines 174 into the device controller 178. It should be noted that the device 178 is a synchronous state machine.

Figure 11:
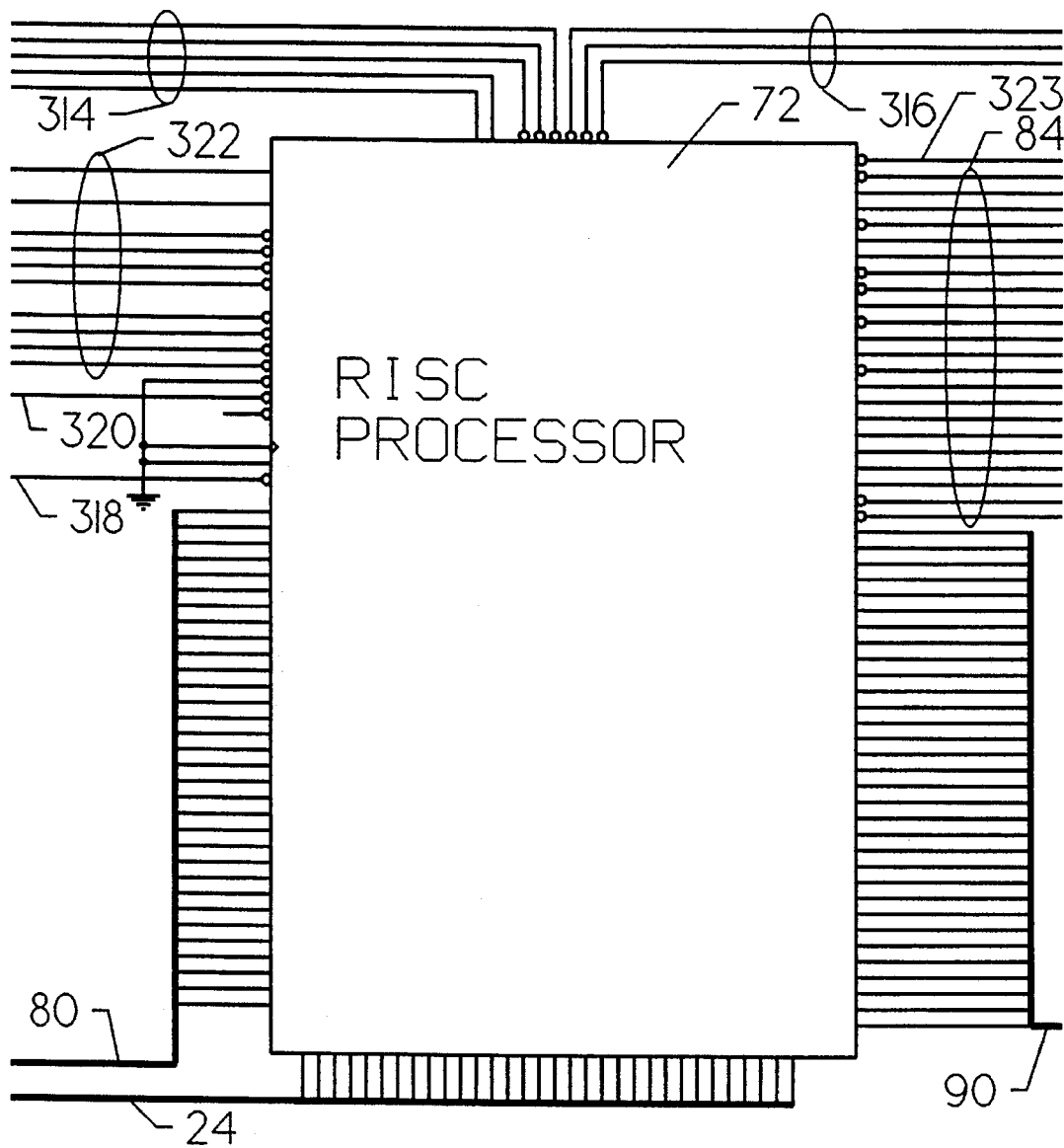
FIG. 11 is a schematic diagram of the connections to the RISC chip.

FIG. 11 is a schematic diagram of RISC processor 72, which is preferably an AMD Model 29000 semiconductor device. Instructions arrive via the 32 bit instruction bus 80 (see also FIG. 2). The operand input/output is directly coupled to main bus 24. Addressing is generated and applied to bus 90. Lines 314 and 316 are the priority interrupt and trap lines, which are processed on a rotating priority basis. These are assigned as follows:

INT0—Any BMC port

INT1—Future Expansion port

INT2—SCSI RAIDS port

INT3—Futurebus+ arbiter interrupt

TRAP0—AM29027 exception trap

TRAP1—Error reporting/maintenance port

Control lines 322 include the system clock, alarms, and various external bus ready signals.

Control lines 84 communicate with the hardwired control logic as explained in more detail below. Included are signal lines for read/write to strobe memory or I/O port, bus invalid to warn the arithmetic co-processor of invalid bus data, instruction burst request of the address and data busses, data width, burst ready to initiate burst mode, bus grant to relinquish control of the bus, data burst acknowledge, data ready, data error, and data request type. Line 320 provides for manual reset of device controller 10. Line 318 provides the opportunity for mode switching as described in detail below. When an external bus request via Futurebus+ occurs, this line is asserted. The RISC processor in due time relinquishes the main busses 24 and 60 control (see also FIG. 2). Also, it asserts line 323 to the requestor.

Figure 12:
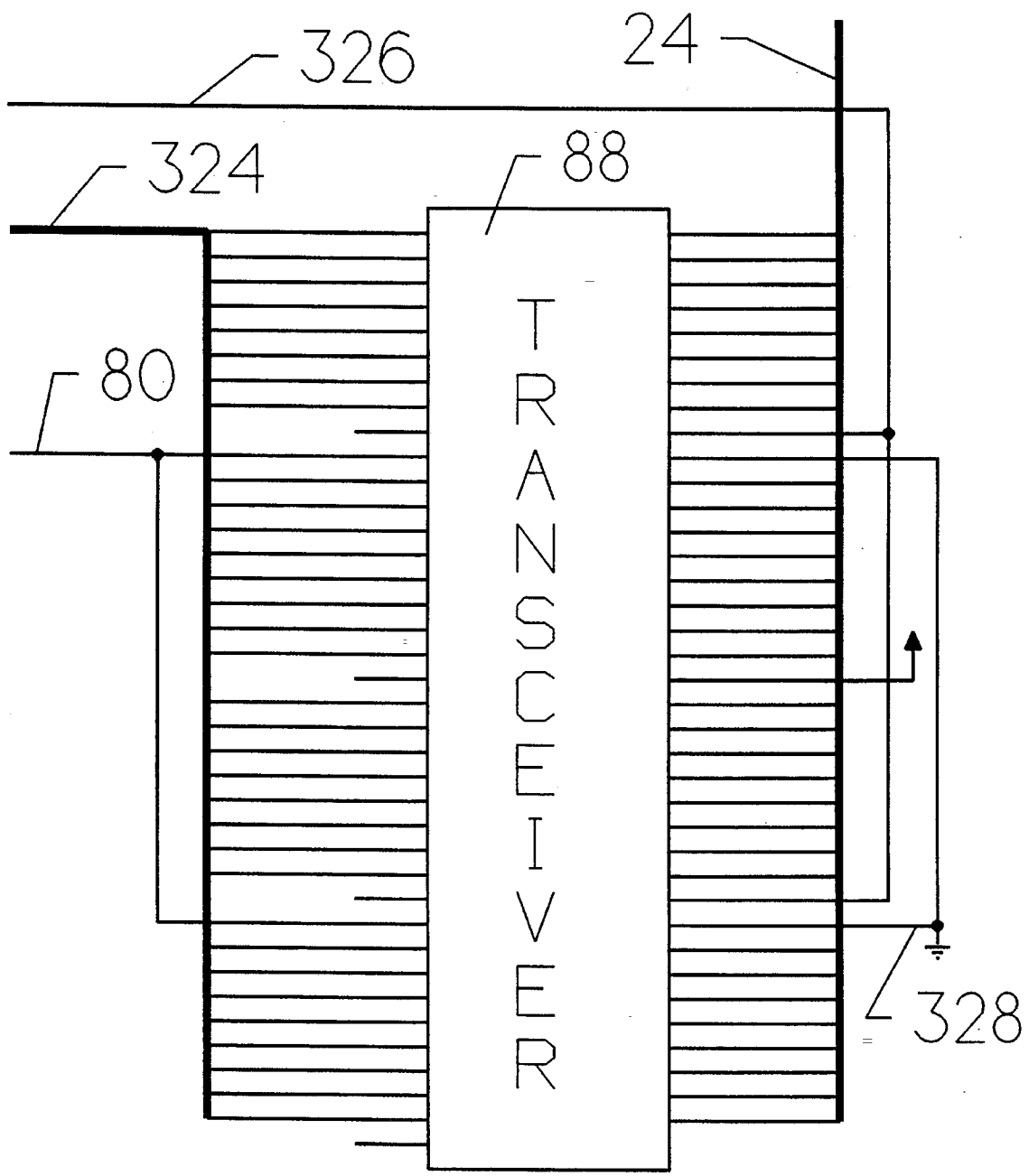
FIG. 12 is a schematic diagram of the connections to the level conversion transceiver.

FIG. 12 is a schematic diagram of transceivers 88 which is preferably a CMOS DT7MP9245 device. This provides a bi-directional path between the instruction and data busses. This permits instruction SRAM 78 to be downloaded with the current microcode from instruction flash memory 76 at the time of power up. Input is via busses 80 and 324. Output is via main bus 24. Line 326 provides the load control signal. Lines 328 are grounded as shown.

Figure 13:
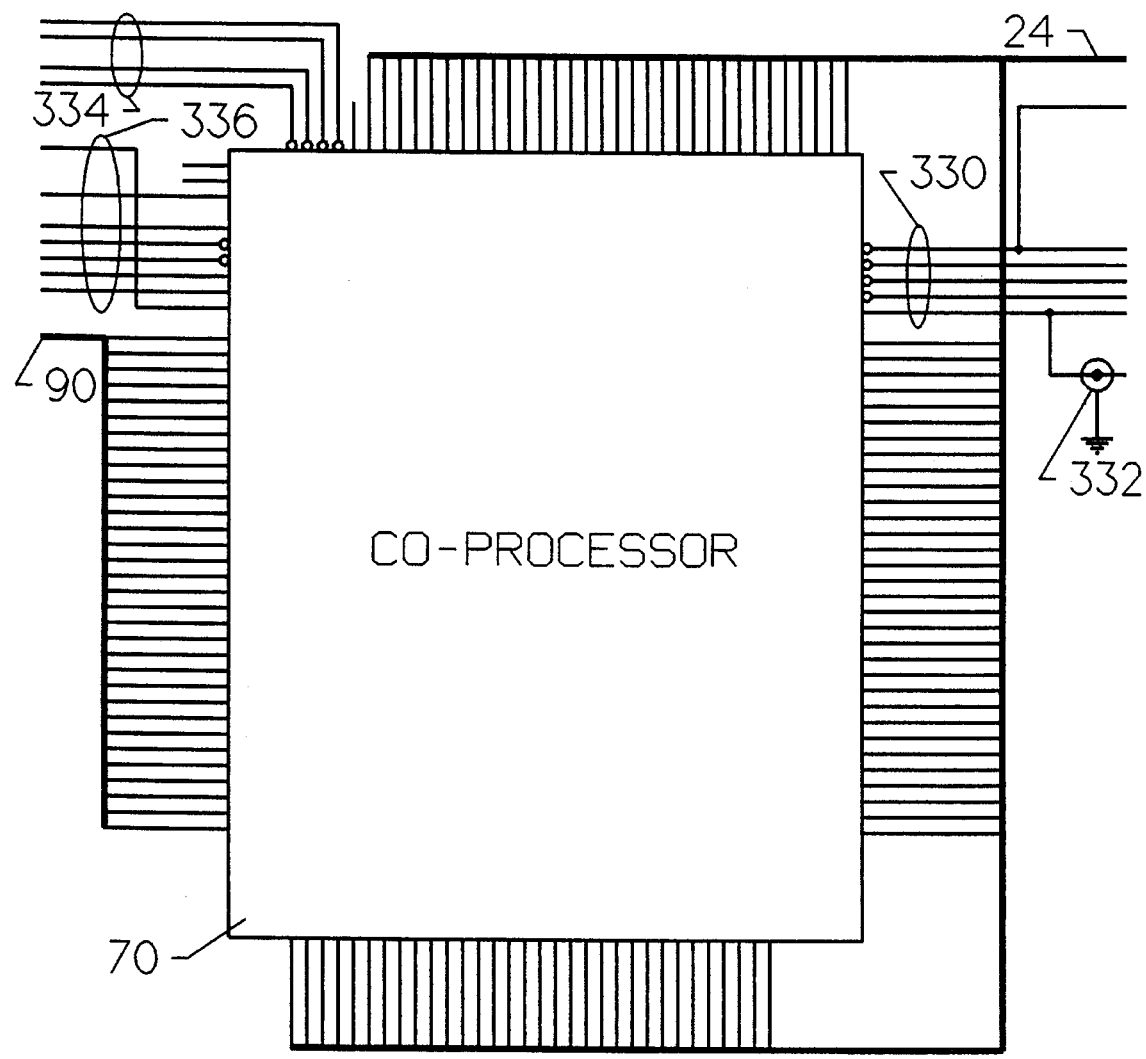
FIG. 13 is a schematic diagram of the connections to the arithmetic co-processor.

FIG. 13 is a schematic diagram of arithmetic co-processor 70. Preferably an AMD 29027 is coupled as a slave device. It is used to enhance floating point performance. Main bus 24 provides for the data inputs and outputs. Addressing is supplied via bus 90. Lines 336 provide the system clock, read/write, data request, and related control signals. Lines 334 provide the access control and reset signals. Lines 330 provide additional control signals: trap TRAP0, ready handshake signals CDA and D_RDY, and exception error signal DERR. Test point 332 provides the opportunity for maintenance personnel to observe the serialized data.

Figure 14:
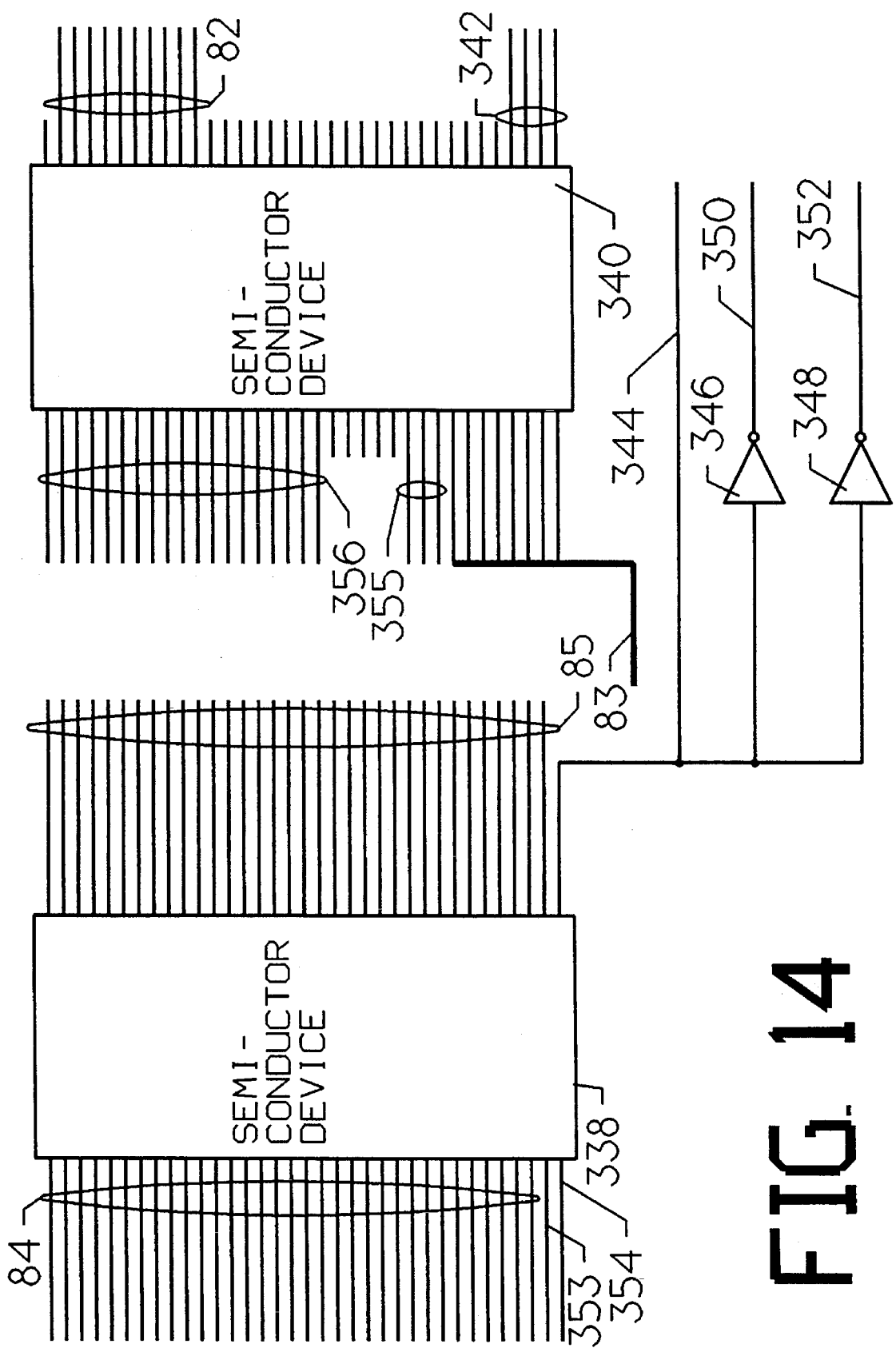
FIG. 14 is a schematic diagram of the control logic.

FIG. 14 is a schematic diagram of various control logic of embedded RISC 58. Semiconductor devices 338 and 340 are preferably high speed MACH130 chips. These devices provide the necessary controls, state sequence, and on board arbitration between the RISC processor, SCSI SIOP, BMC controller and Futurebus+ bus request. They are programmed to implement hardwired control of the particular protocols supported by a given device controller. Bus 83 relates to signals associated with SCSI direction of the data. Bus 84 relates to the input control signals associated with the RISC processor, and the SIOP 212 (see also FIG. 6). Bus 356 relates to the input control signals associated with the RISC processor and the CRC chip. Line 354 is the board reset signal generated either by reset switch or by POC (power on clear).

The signal on line 353 is associated with the maintenance port. This SER_INT signal generates TRAP0 of bus 85. Bus 85 provides control signals for RISC processor, transceivers 88 (see also FIG. 12), various types of memory chip selects, cycle controls, SCSI device select, CRC device select, and TRAP0 generation. Bus 82 relates to the following output signals:

Transaction transfer size between Futurebus+ and RISC processor busses for reading and writing buffer memory 62 (see also FIG. 2)
Read/write transfer length related to Futurebus+ interface.
Host side address and data strobes related to Futurebus+.
Bus grant to Futurebus+.

Lines 355 and lines 342 relate to SCSI SIOP, and to address strobe and ready handshake SCSI transceivers, respectively.

Figure 15:
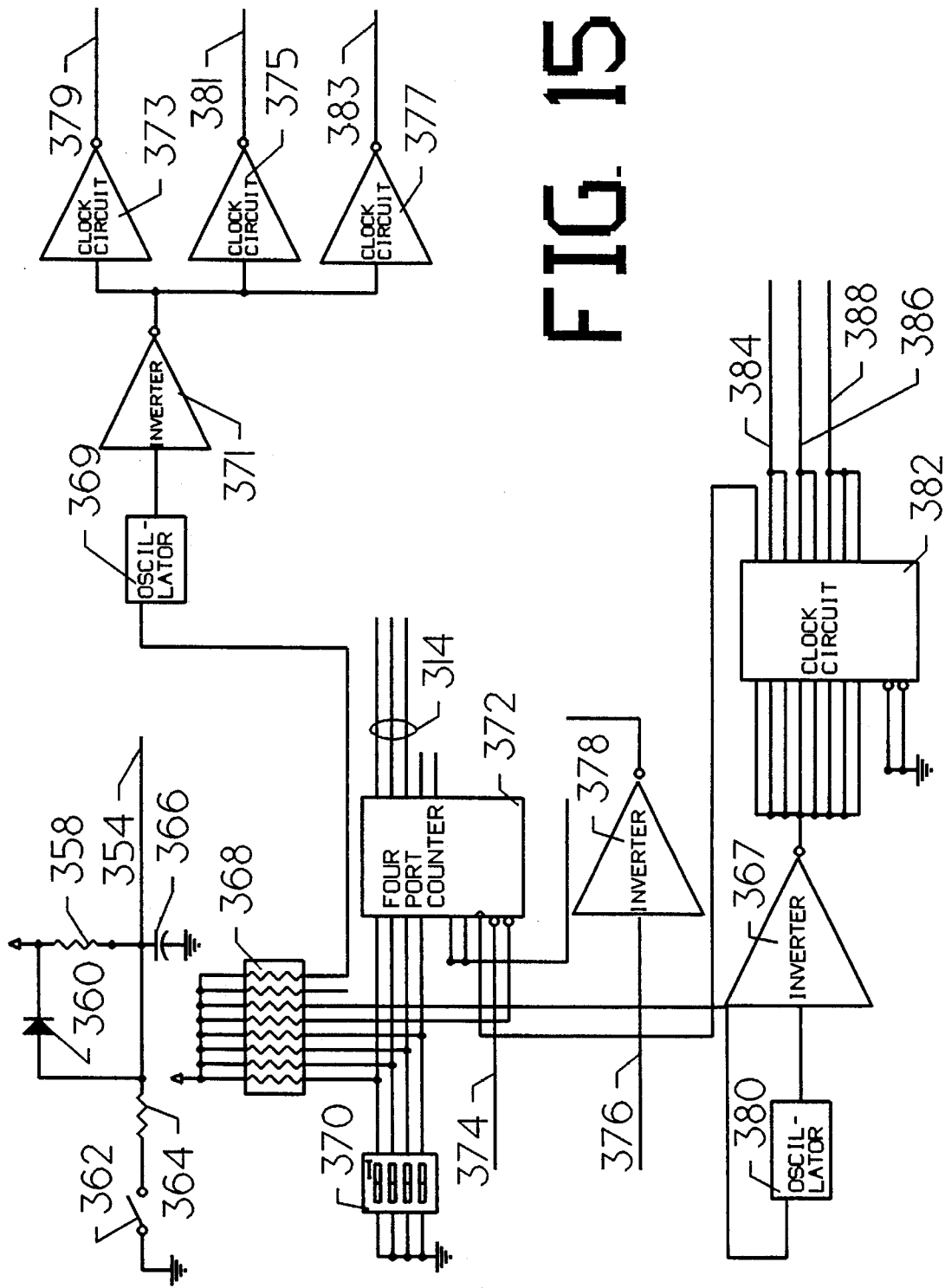
FIG. 15 is a schematic diagram of additional control logic.

FIG. 15 is a schematic diagram of additional special purpose control logic. Single pole/single throw momentary contact switch 362 provides the manual reset function (see also FIG. 14). Resistor 358 coupled to the positive supply voltage pulls up reset line 354 whenever switch 362 is open. When switch 362 is closed, the supply voltage is dropped across resistors 358 and 364. Capacitor 366 tends to debounce the manual input. Manual switches 370 permit the operator to modify the wait states of the RISC processor. The outputs of switches 370 are loaded into four bit counter 372, which is preferably a 74F161 semiconductor device. The data inputs to four bit counter 372 are pulled up by pull up resistors 368. The output of four bit counter 372 is applied to lines 314. The preload control of four bit counter 372 is via line 374, with the I/O ready signal. The counter 372 is enabled via line 376 as inverted by invertor 378, with the I request signal.

Oscillator 380 provides the basic 25 MHz signal which times all internal operations of device controller 10. Oscillator 380 via invertor 367 drives clock circuit 382 producing system clock on line 388, system clock 1 on line 386, and system clock 2 on line 384. Clock circuit 382 is a 74F244 semiconductor device providing minimum clock skew. Oscillator 369 provides the basic 50 MHz clock required for Futurebus+ chip set. Oscillator 369 via invertor 371 drives clock circuits 373, 375, and 377 producing REF_CLK1, REF_CLK2, and REF_CLK3, respectively. These reference clocks go to protocol controller 110 (FIG. 23), data path controller 122 (FIG. 26), and arbitration controller 104 (FIG. 25), respectively.

Figure 16:
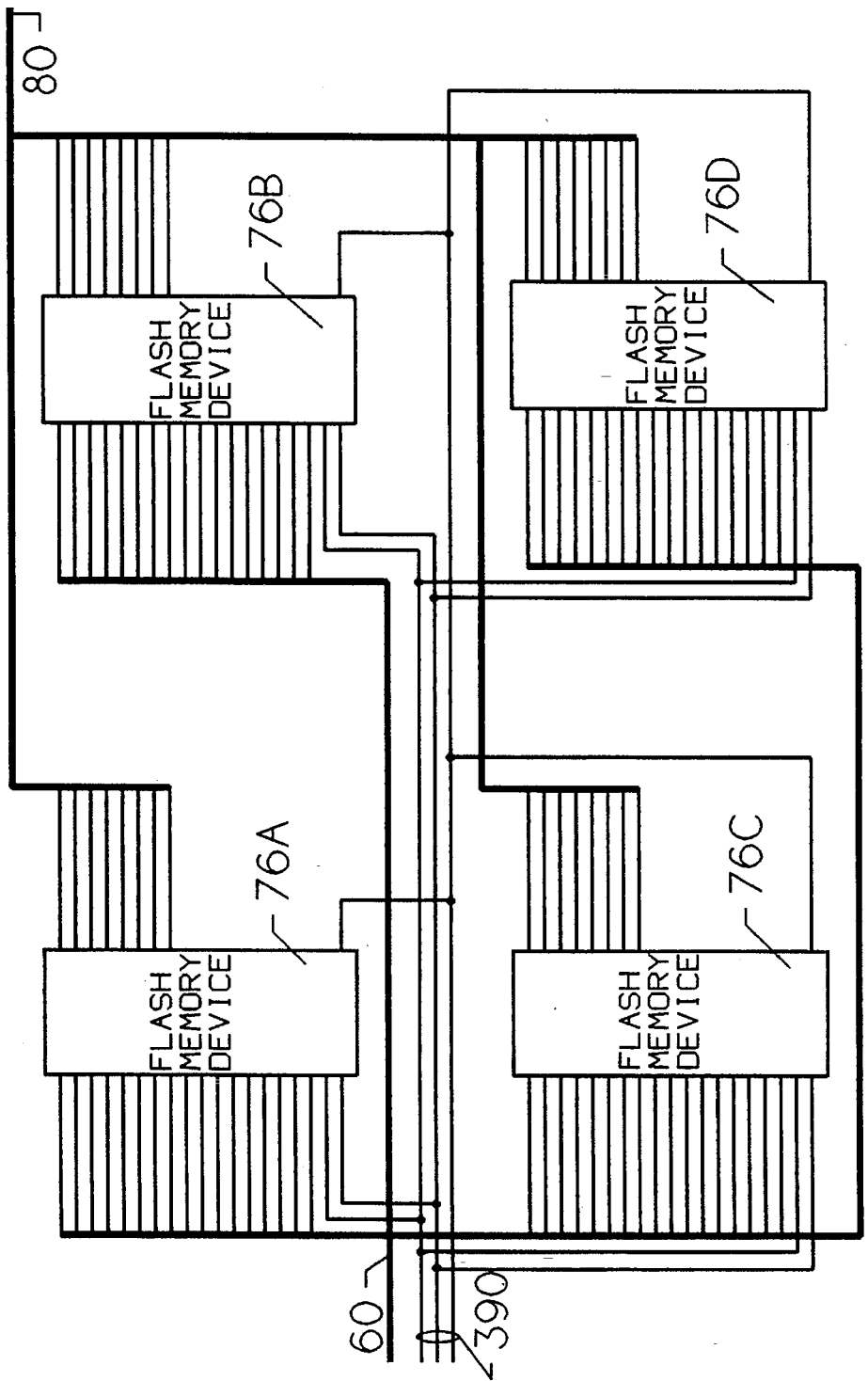
FIG. 16 is a schematic of the instruction flash memory.

FIG. 16 is a schematic diagram of instruction flash memory 76. It is preferably comprised of four type AM29F010 EPROM devices. It contains the microcode during the power off state. At power up, the control logic loads the microcode into the volatile instruction SRAM. Because instruction flash memory 76 is an EPROM device, it can be altered to change the basic characteristics of device controller 10.

Instruction flash memory 76 is a 32 bit by 128k word array. It is addressed by the seventeen least significant bits of address bus 60. Each of the memory devices (i.e. 76A, 76B, 76C, and 76D) stores one of the bytes of each of the 128k words. Device 76A stores the least significant byte. Device 76B stores the next least significant byte. Devices 76D and 76C store the most significant and the next most significant bytes. The output of instruction flash memory 76 is placed on data bus 24. Lines 390 provide the signals which control read and write timing.

Figure 17:
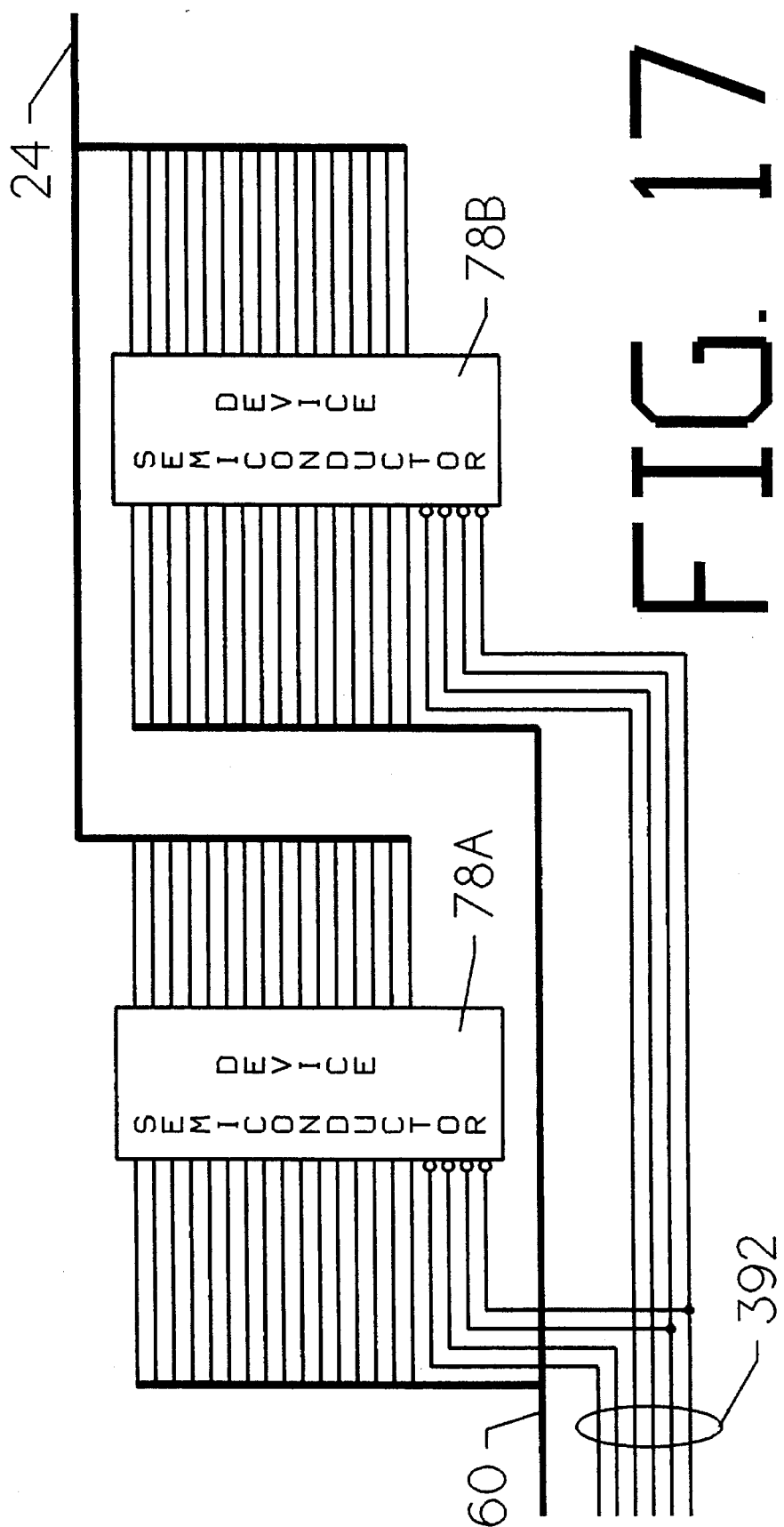
FIG. 17 is a schematic diagram of the data/instruction (SRAM) buffer memory.

FIG. 17 is a schematic diagram of the instruction SRAM 78. It stores up to 64k instructions of 32 bits each, which are used to control processor 72 during normal power up operation. Preferably instruction SRAM consists of two IDT8M624S semiconductor devices. Each stores 64k words of 16 bits each. Device 78A stores the least significant half of the instruction word. Device 78B strobes the most significant half of the instruction word. The 32 bit instructions are placed on instruction bus 80. Lines 392 provide the control signals, which enable reading and writing and control the timing thereof.

Figure 18:
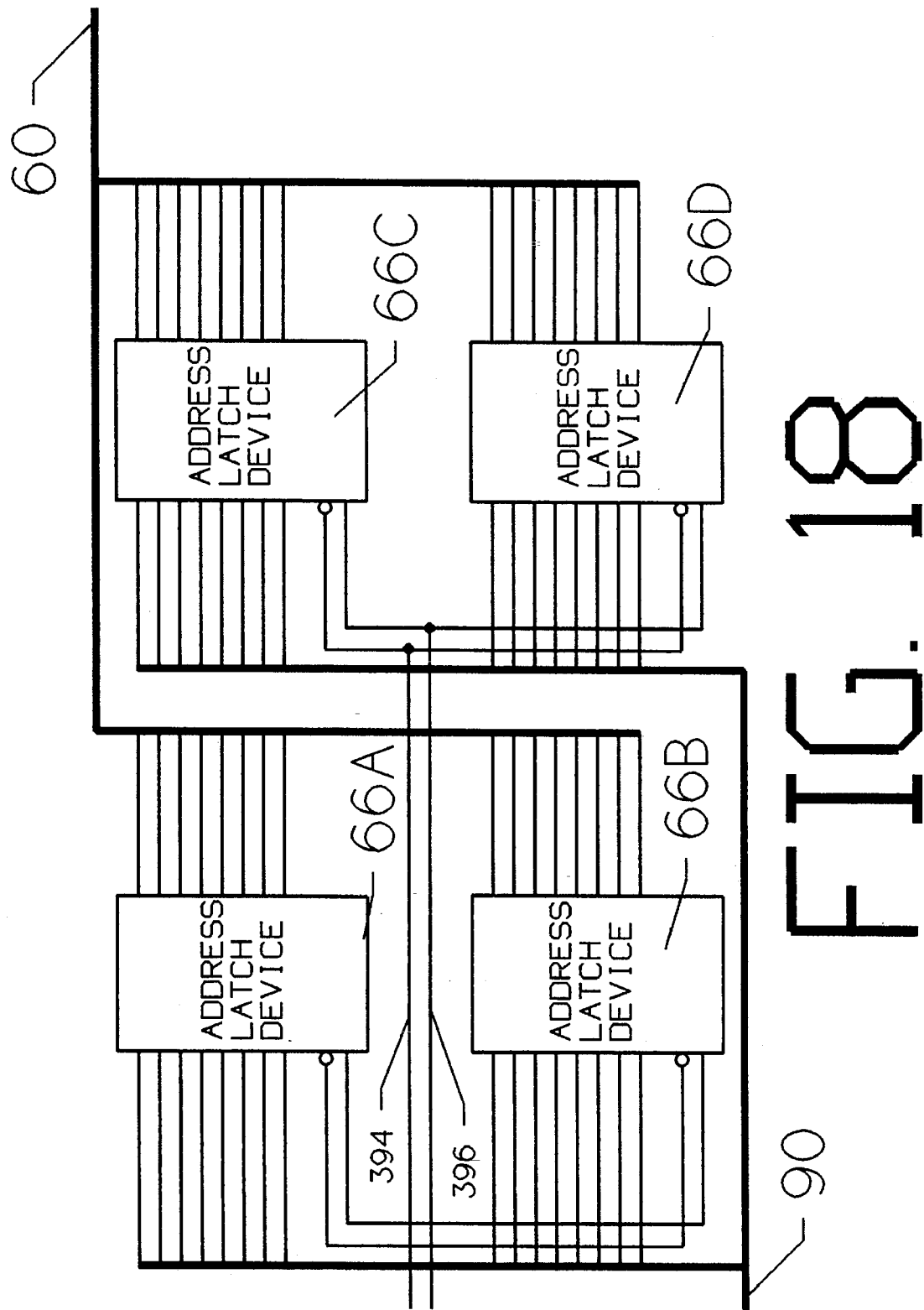
FIG. 18 is a schematic diagram of the data/instruction buffer memory drivers.

FIG. 18 is a schematic diagram of the address latches 66. Each of devices 66A, 66B, 66C, and 66D is a 74F373 semiconductor device latching one eight bit byte of the address word. This provides an address bus 60 for SRAM, flash, and buffer memories, along with Futurebus+ data path 122, for read/write operations. As explained above, this permits the microcode in instruction flash memory 76 to be downloaded into instruction SRAM 78 at power up. Lines 394 and 396 provide the address latch strobe and address output enable, respectively.

Figure 19:
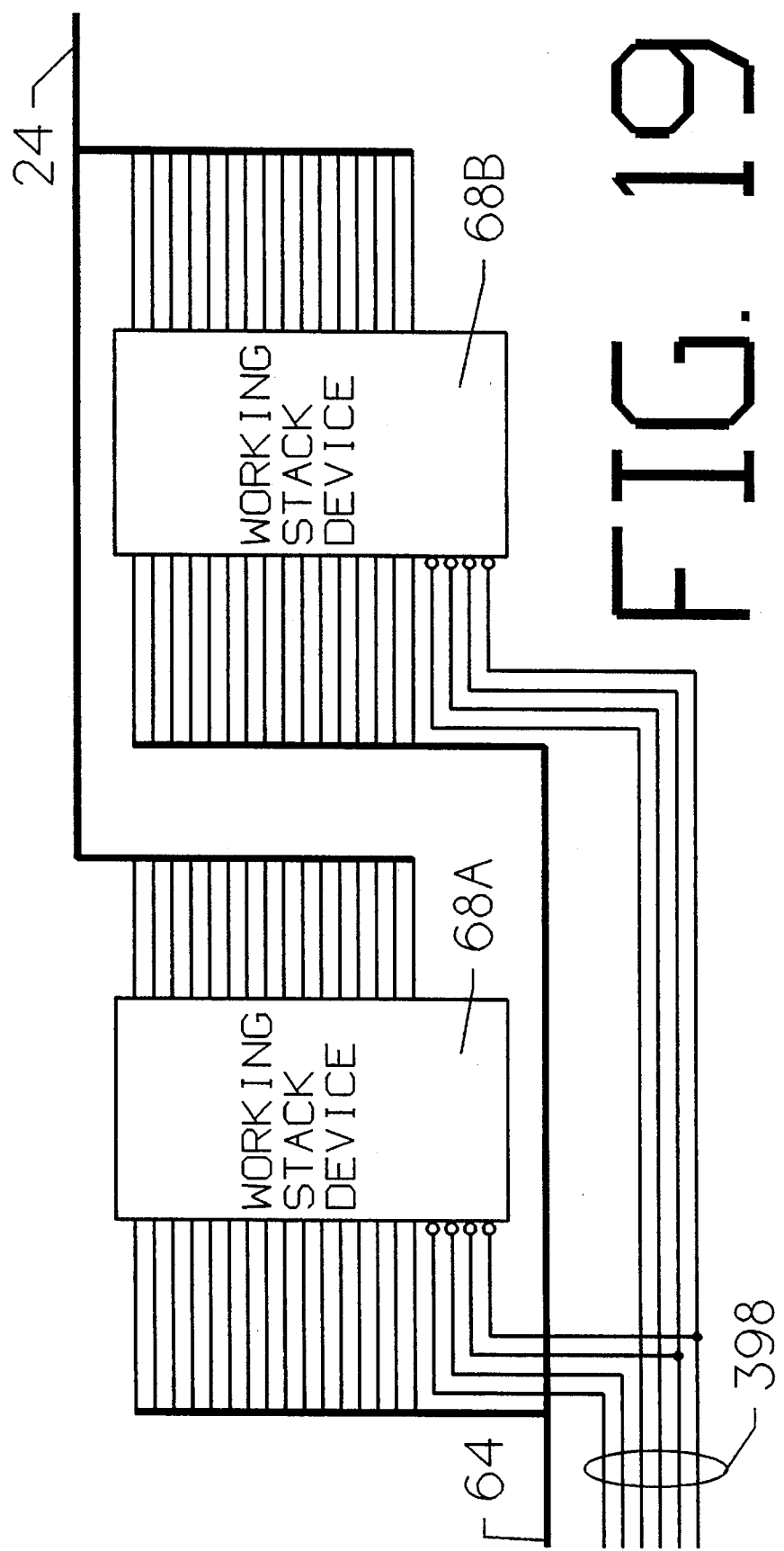
FIG. 19 is a schematic diagram of the working stack.

FIG. 19 is a schematic diagram of working stack 68. This is a high speed temporary memory for 64k words of 32 bits each. This resource provides embedded RISC 58 with temporary working storage. Overall performance is considerably enhanced by this feature.

Working stack 68 is implemented as two IDT8M624S devices (i.e. 68A and 68B), each of which storing one half of the 64k 32 bit words. Addressing is via bus 90, which is provided directly by the RISC processor. Data is read and written via main bus 24. Lines 398 provide the normal read/write and timing controls.

Figure 20:
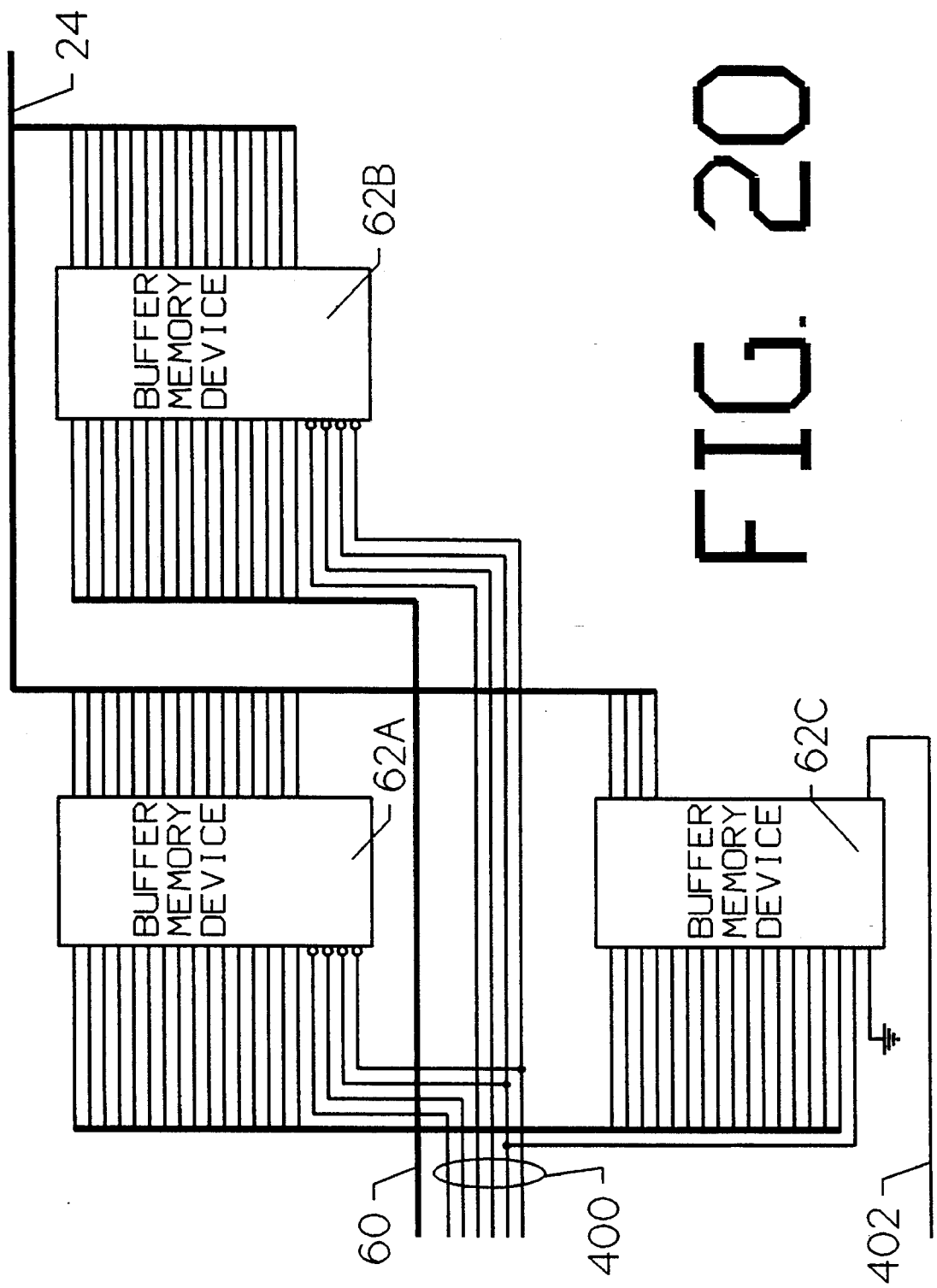
FIG. 20 is a schematic diagram of the buffer memory.

FIG. 20 is a schematic diagram of buffer memory 62. It is used as temporary storage for the data, commands, status, and error involved in the actual input/output transfers amongst BMC, SCSI, Futurebus+, and RISC processor. Therefore, it comprises 36 bit words (i.e. 32 data bits and 4 parity bits). A total of 64k words are available. Type IDT8M624S semiconductor memory devices 62A and 62B each store one half words (i.e. 16 bits). Similar device 62C is only partially used to store the four parity bits of each word. Addressing bus 60 provides the addressing input. Main bus 24 accommodates the read and write data. Control lines 400 provide the normal read/write control and timing. Control line 402 provides a separately timed data enable for the parity storage.

Figure 21:
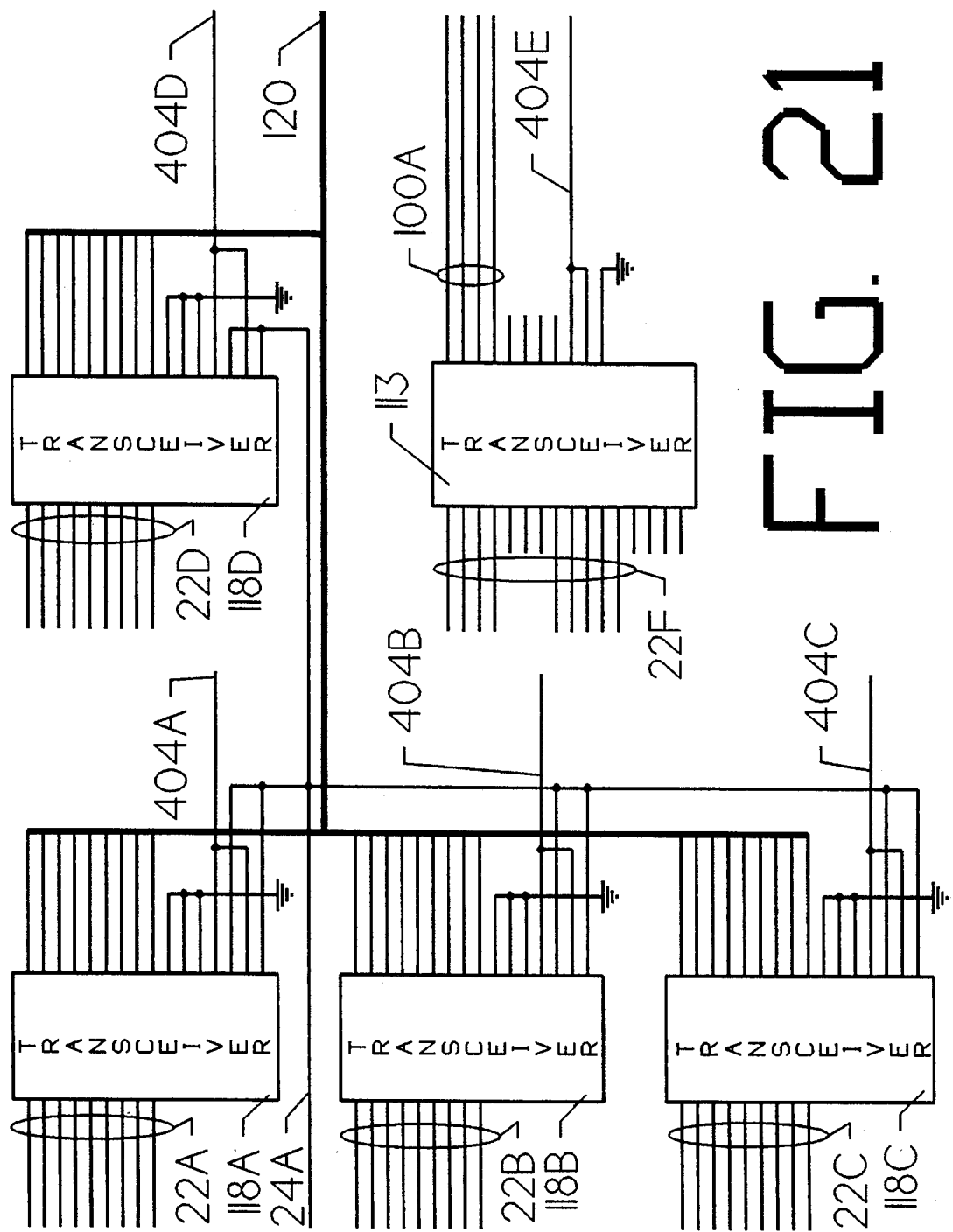
FIG. 21 is a schematic diagram of the Futurebus+ address/data interface.

FIG. 21 is a schematic diagram of the Futurebus+ data/address and bus request (BR)/bus grant (GR) interface. The primary bi-directional data/address interface consists of four type 74FB2031 BTL transceivers (i.e. 118A, 118B, 118C, and 118D) which couple the internal levels of device controller 10 to the standardized levels of Futurebus+ 22. Each of the four transceivers handles one eight bit byte plus parity. Bus 120 is the bus provided to data path controller 122 containing the 36 bit words (i.e. 32 data/address bits and 4 parity bits). The reading/writing of data/address is controlled by the line 24A. This line transfers the signal generated by the protocol controller 110 (see also FIG. 23). Transceivers 113 provides level conversion for the bus request/bus grant control signals. The bus request signals are coupled via lines 100A. Lines 404E couple to pull up resistors.

Figure 22:
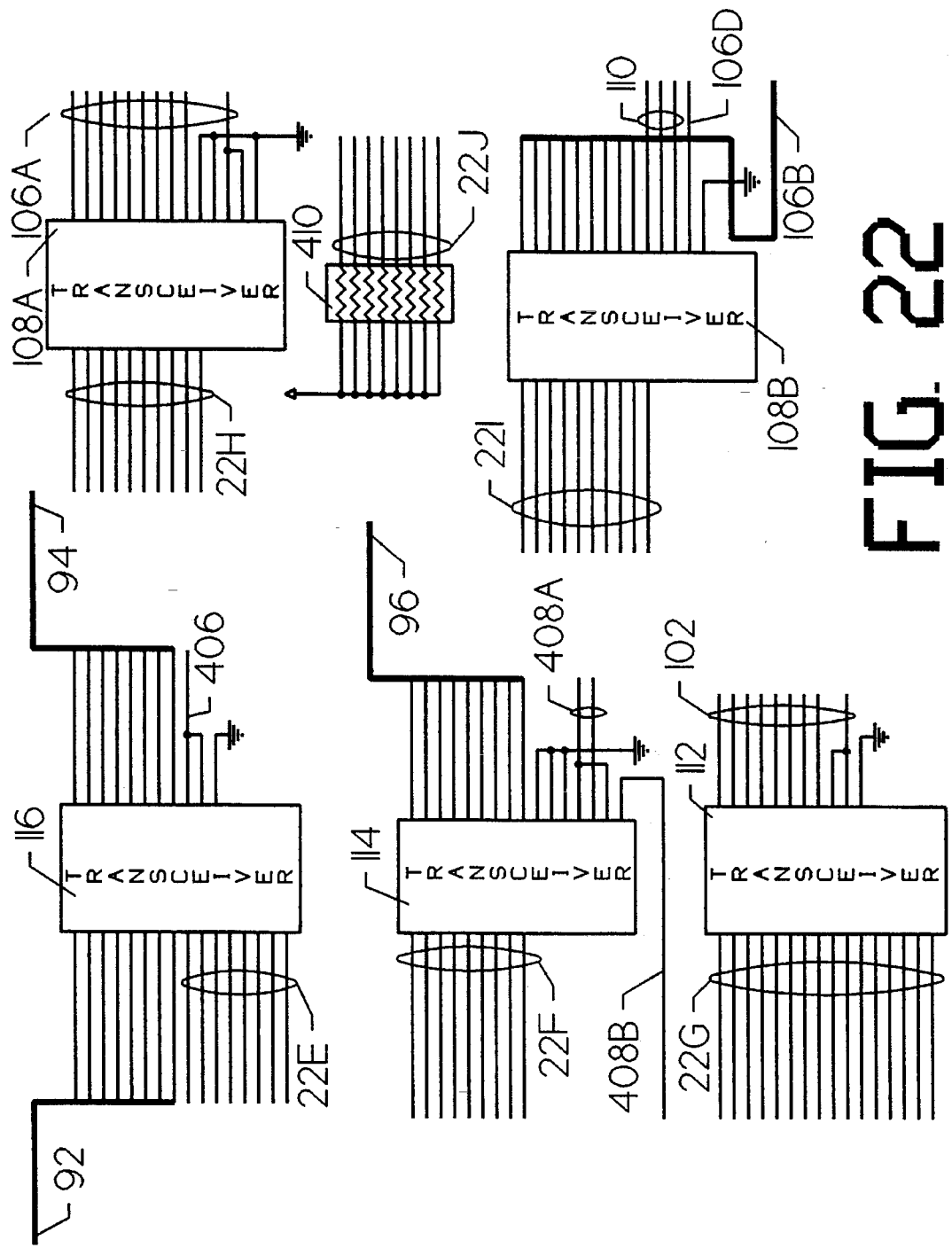
FIG. 22 is a schematic diagram of the Futurebus+ interface circuitry.

FIG. 22 is a schematic diagram of the Futurebus+ interface transceivers. Transceivers 116, consisting of a type 74FB2040 semiconductor device, is the conversion device for the eight bit status byte. The internal couplings are busses 92 and 94 to data path controller 122 and parallel protocol controller 110, respectively. Line 406 provides the data enable to Futurebus+ 22.

Command signals are handled by transceivers 114, which consist of nine bit type 74FB2031. The additional bit provides parity for the command byte. The internal command bus 96 couples to parallel protocol controller 110. Futurebus+ data enable is placed on line 408A. Command, read, and write operation is controlled by line 408B. Transceivers 112, consisting of a type 74FB2040 semiconductor, provides a bi-directional interface for the data and address synchronization signals defined in the Futurebus+ protocol. Internal bus 102 couples directly with parallel protocol controller 110.

The signals associated with arbitration are converted by transceivers 108A and 108B. These are type 74FB2032 semiconductor devices. Bus 106A provides the geographical address and arbitration condition signals to arbitration controller 104. Bus 106B provides the Futurebus+ contest number and parity inputs to arbitration controller 104. Control lines 110 are related to competition transceiver enable, arbitration contest logic completion, and TTL driver on competition transceiver enable. Pull up resistors 410 supply the pull up resistors used for TTL inputs.

Figure 23:
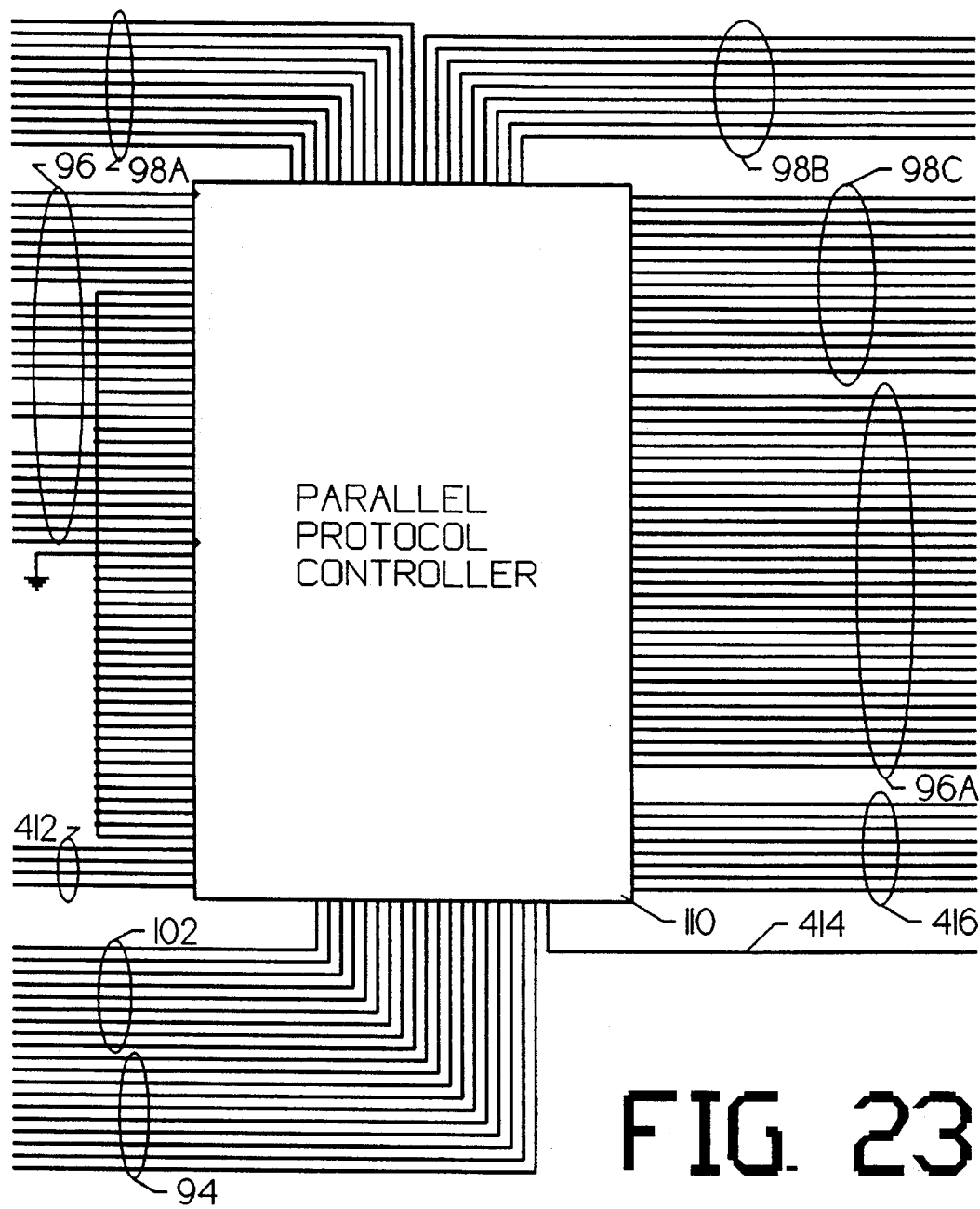
FIG. 23 is a schematic diagram of the Futurebus+ parallel protocol controller.

FIG. 23 is a schematic diagram of parallel protocol controller 110. It is a TFB2002 semiconductor device. It is the main controller for operations on Futurebus+ 22. Control lines 412 provide for orderly reset of the Futurebus+ interface logic. Line 414 is the most significant bit of the status byte. It couples to transceivers 116. Buses 98A, 98B, and 98C relate to interface signals to data path controller 122. Bus 96 provides interface control signals related to host RISC processor 72. These are mainly related to bus acquisition, transaction length, and interrupt INT3. Bus 96A, bus 102, and bus 94 are related with sync, status, command, and arbiter control signals. Control lines 416 relate to Futurebus+ reset port.

Figure 24:
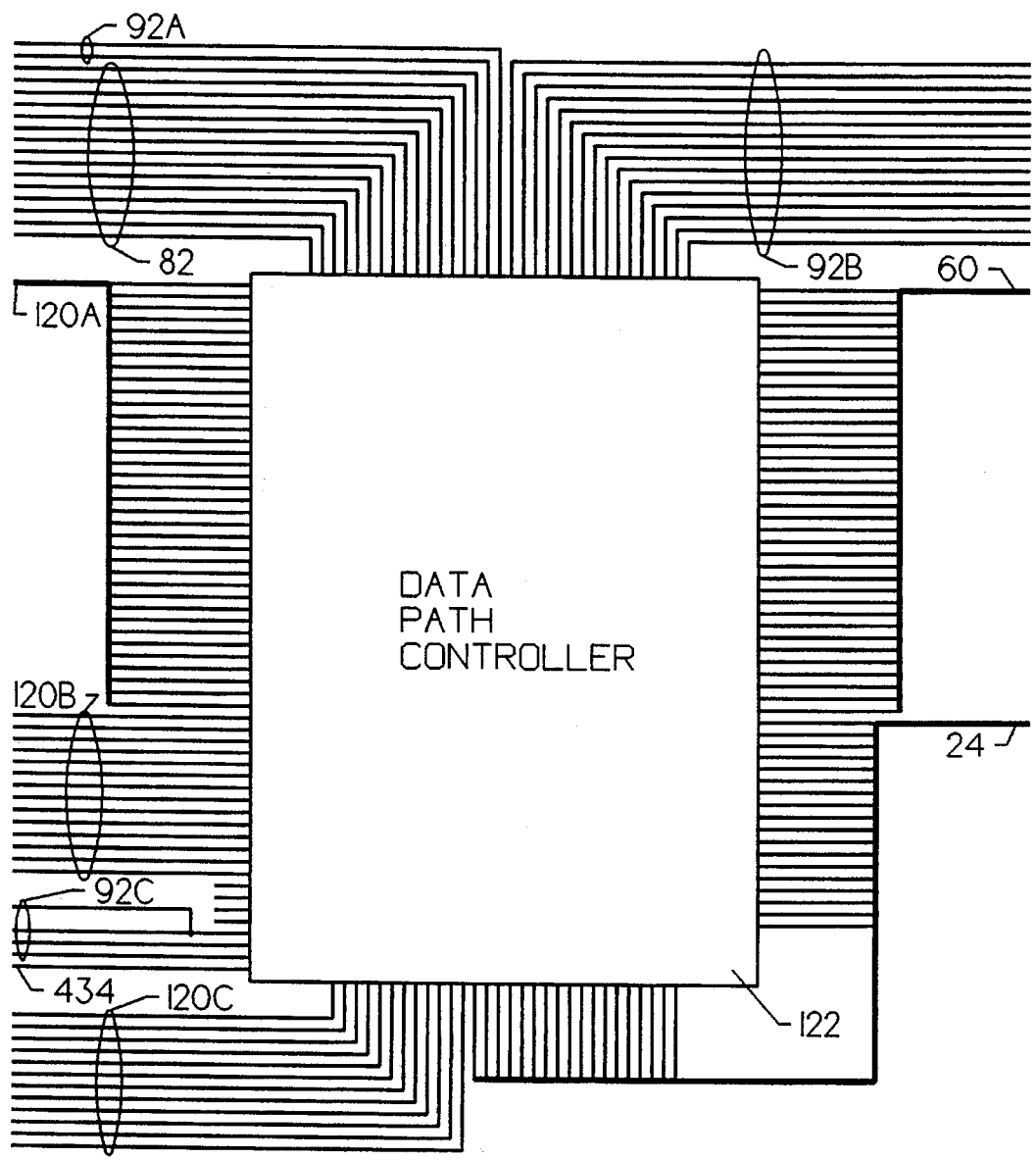
FIG. 24 is a schematic diagram of the Futurebus+ data path controller.

FIG. 24 is a schematic diagram of data path controller 122. It is a type TFB2022 semiconductor device. Bus 82 provides transaction related signals to the host RISC processor. Buses 92A, 92B, 92C, and 120C provide interface signals amongst data path controller 122 and protocol controller 110. Bus 120A is an address/data bus interfaced to Futurebus+ transceiver 118 (see also FIG. 21). This is a bidirectional bus. Bus 60 is an address bus interfaced to embedded controller 58. This is also a bidirectional bus. Likewise, bus 24 is a bidirectional data bus interfaced to embedded controller 58. Bus 120B provides Futurebus+ input sync, geographical, status, and command control signals. Lines 434 relate to Futurebus+ rest port. This device is connected as a 32-bit address/data path device.

Figure 25:
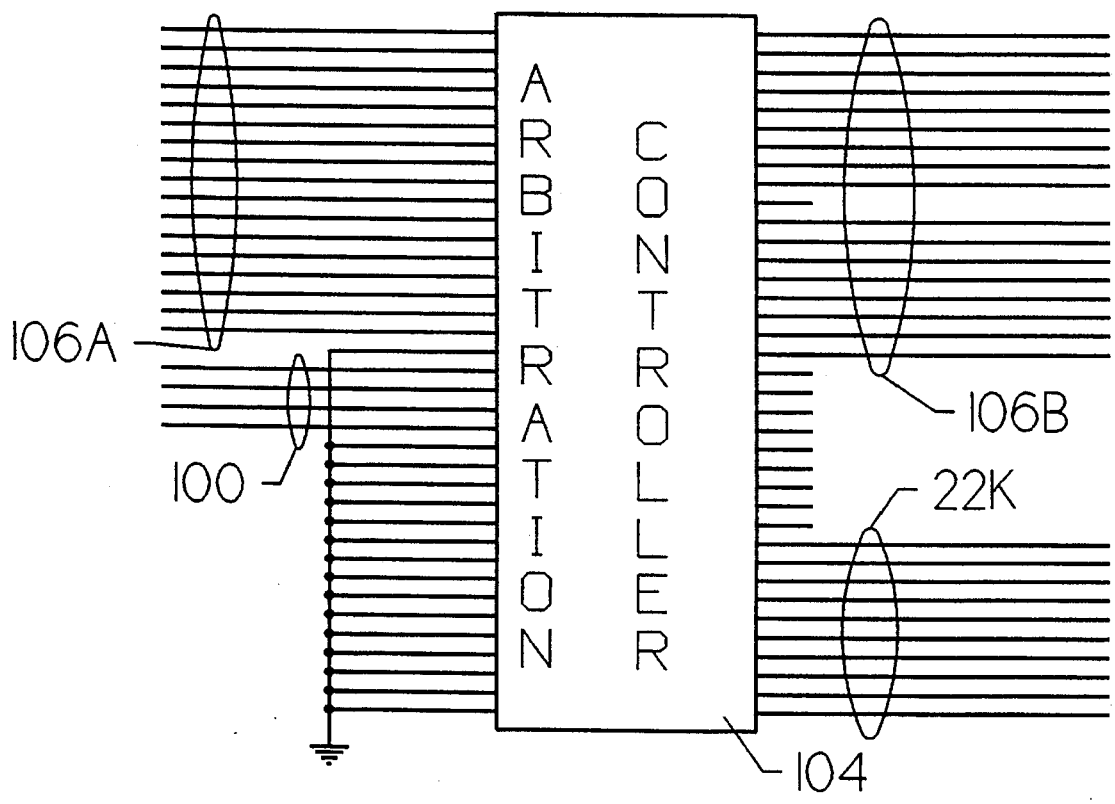
FIG. 25 is a schematic diagram of the Futurebus+ arbitrator.

FIG. 25 is a schematic diagram of arbitration controller 104. It is a type TFB2010 semiconductor device. All interfaces are as previously defined, wherein buses 106A (arbitration bits, address strobe, and geographical address) and 106B (contest number and parity bits) couple to transceivers 108A and 108B, respectively (see also FIG. 22). Bus 22K is represents JTag port and reset port. Bus 100 provides control and timing information.

Figure 26:
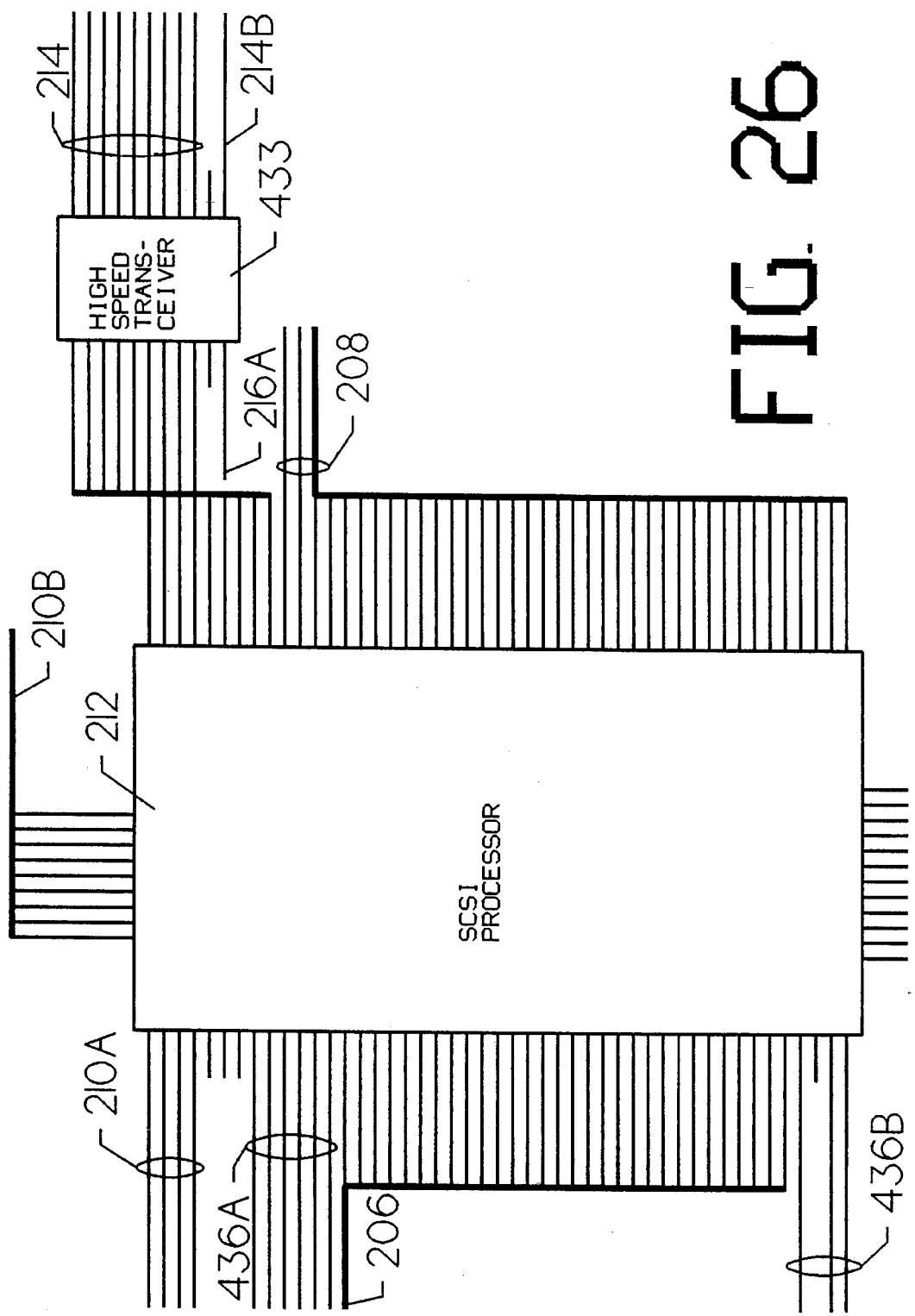
FIG. 26 is a schematic diagram of the disk subsystem/RISC interface.

FIG. 26 is a schematic diagram of SCSI processor 212. It consists of an NCR type 53C700 semiconductor device. It interfaces directly to the main data bus 24 via lines 206. The RISC processor 72 sends SCSI command to initiate the transactions and then into DMA mode for burst transactions to the SIOP 212. This processor fetches instructions from the RISC processor memory 68. Algorithms written in 32-bit SCSI SCRIPTs can control the action of the SCSI and DMA cores. Complex SCSI bus sequences are executed independently of the RISC processor. Interrupt INT2 is provided by the SIOP by one of the lines 436A. The SIOP 212 goes on its own pace to transfer data on the disk array. The traditional arbitration handshake HOLD, HLDA READY, etc. are used to start the transaction.

High speed transceiver 433 provides SCSI with an 8-bit data and parity interface to SCSI data path unit 204 via lines 214. Direction control is provided by lines 216A and 214B. Control lines 436A provide individual byte control of the data transfers. Individual read/write control is provided by control lines 436B.

Figure 27:
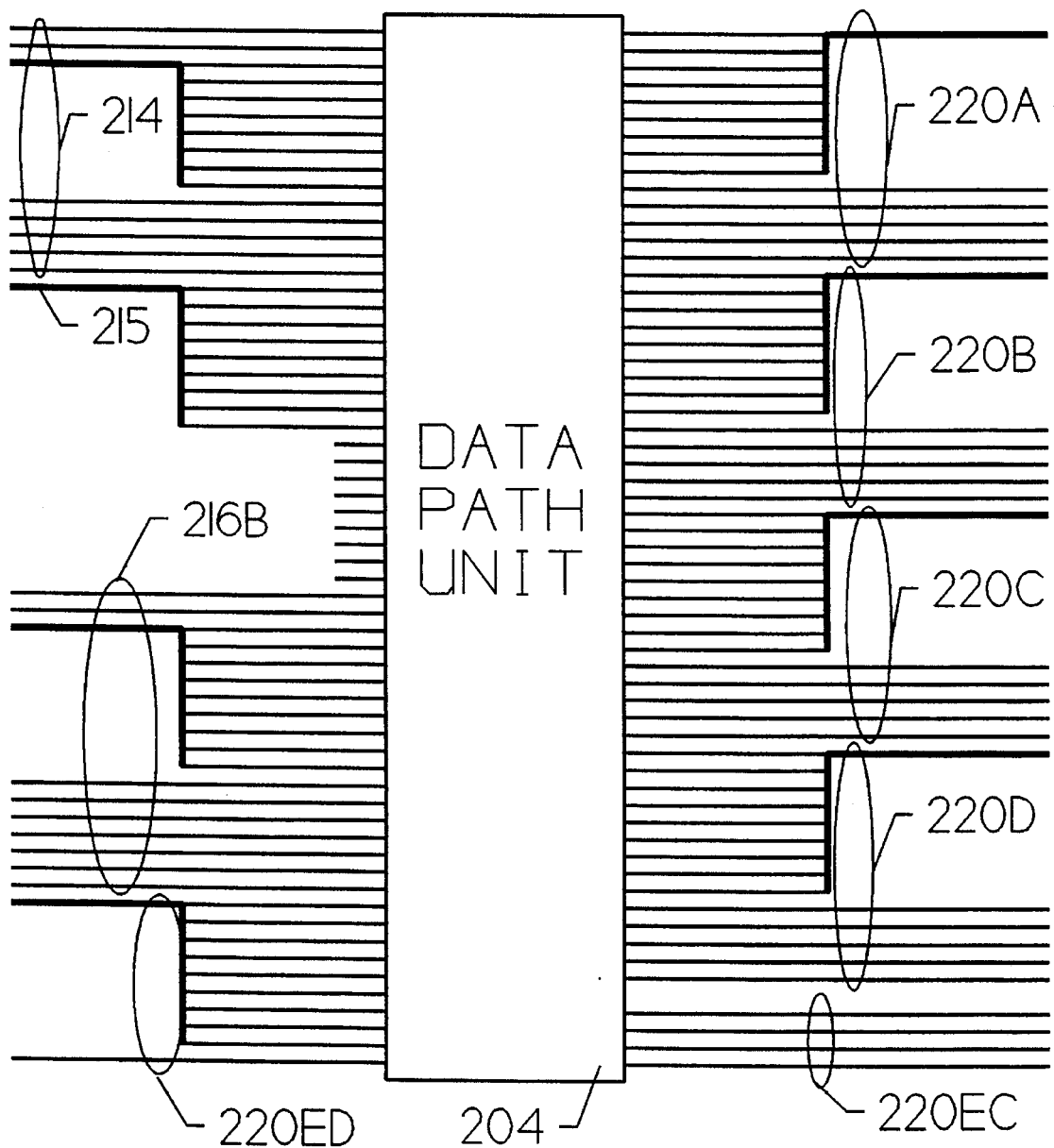
FIG. 27 is a schematic diagram of the disk subsystem/RISC data path.
Figure 29:
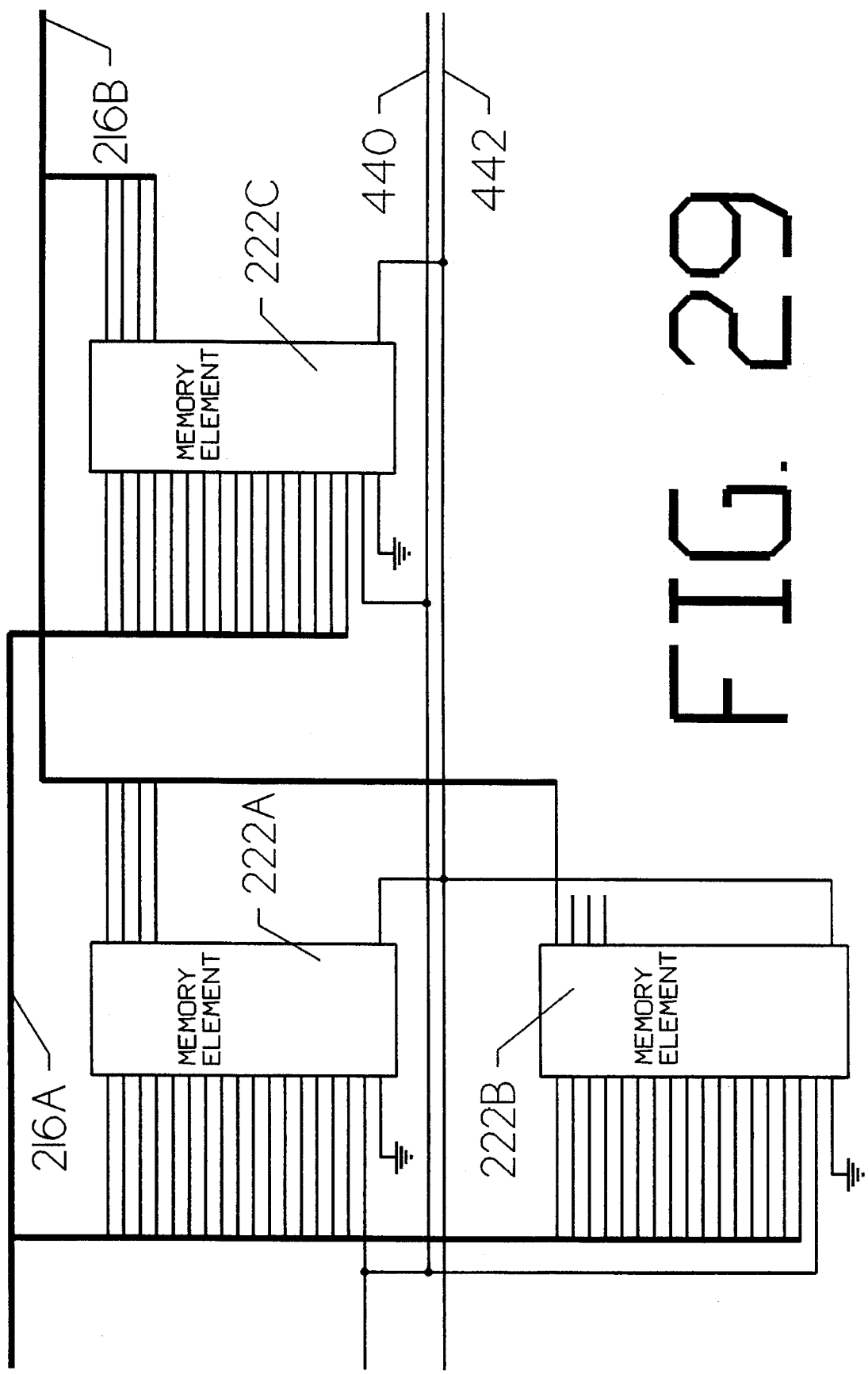
FIG. 29 is a schematic diagram of the disk subsystem buffer memory.

FIG. 27 is a schematic diagram of the data path unit 204 used in RAID 5 configuration. It is an NCR type 53C920 ASIC device. It performs data routing, data multiplexing and de-multiplexing, parity generation, and parity checking functions required to implement a low cost disk array controller. It has 8-bit address/data and control bus 214 to RISC processor interface for diagnostic and initialization. Bus 215 interfaces to SIOP (see also FIG. 26). It interfaces transfer data and parity to the five array SCSI 53C94 array controllers via 220ED, 220A, 220B, 220C, and 220D separate busses. The SCSI buffer memory as shown in FIG. 29, provides temporary storage of and access to intermediate data in an external location during RAID read-modify-write operations. Bus 216B provides interface to this buffer memory.

Figure 28:
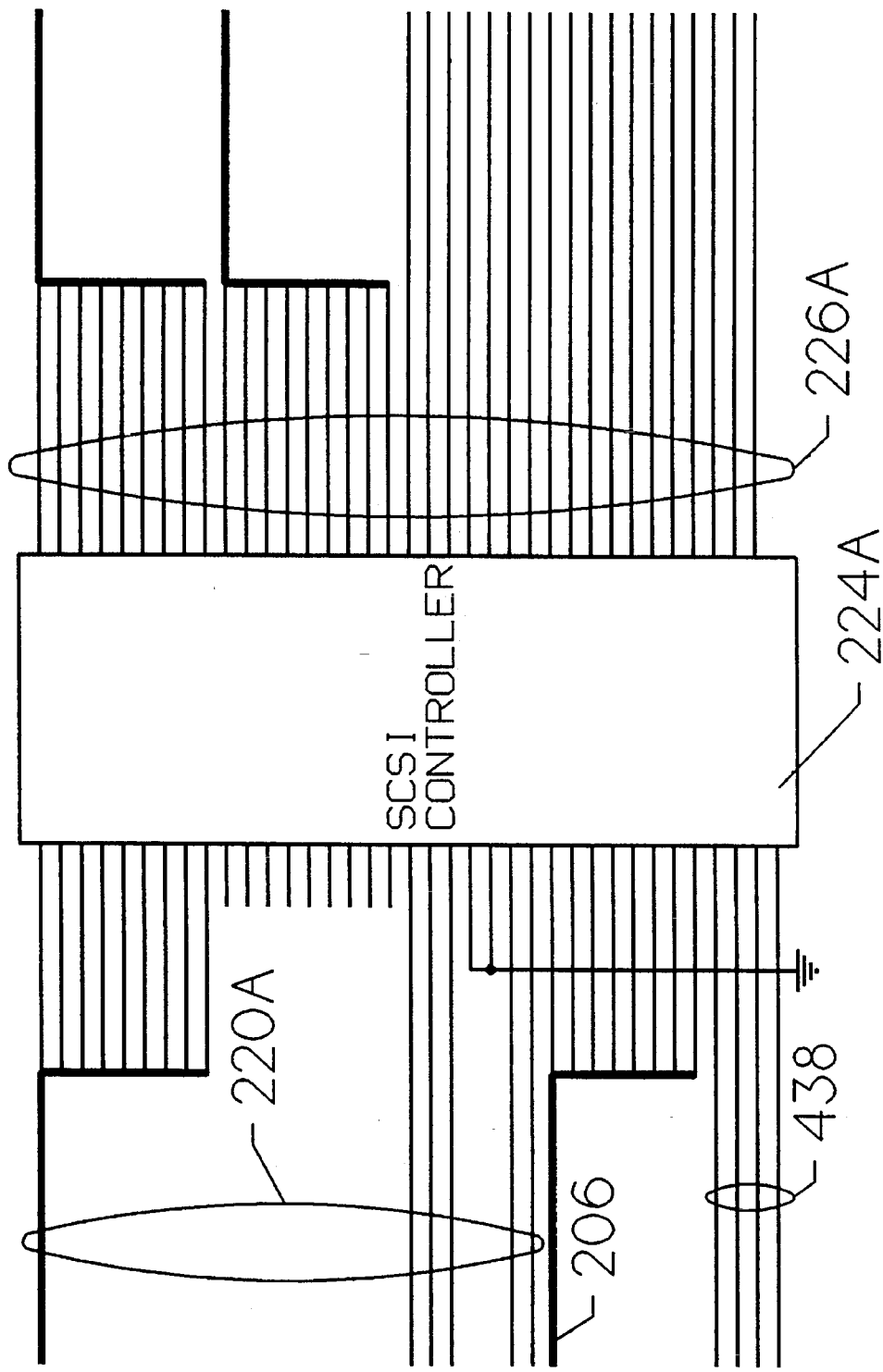
FIG. 28 is a schematic diagram of one of the individual disk controllers.

FIG. 28 is a schematic diagram of one of the individual disk drive interfaces. Each of up to five interface devices is an NCR type 53C94 semiconductor device. Read/write, system clock, and timing control signals are supplied by control lines 438. Bus 206 interfaces to the host RISC processor via multiplexer 42 (see also FIG. 2). This is mainly used for diagnostic purposes. Bus 226A provides small SCSI interface signals for the SCSI drive.

FIG. 29 is a schematic diagram of dedicated disk storage subsystem buffer memory 222. It is implemented from three four bit type IDT61298S SRAM devices. It has a storage capacity of 64k four bit nibbles. Memory elements 222A and 222C each store one half byte. Memory element 222B stores the corresponding parity bit. Read/write control and timing is provided by control lines 440 and 442.

Figure 30:
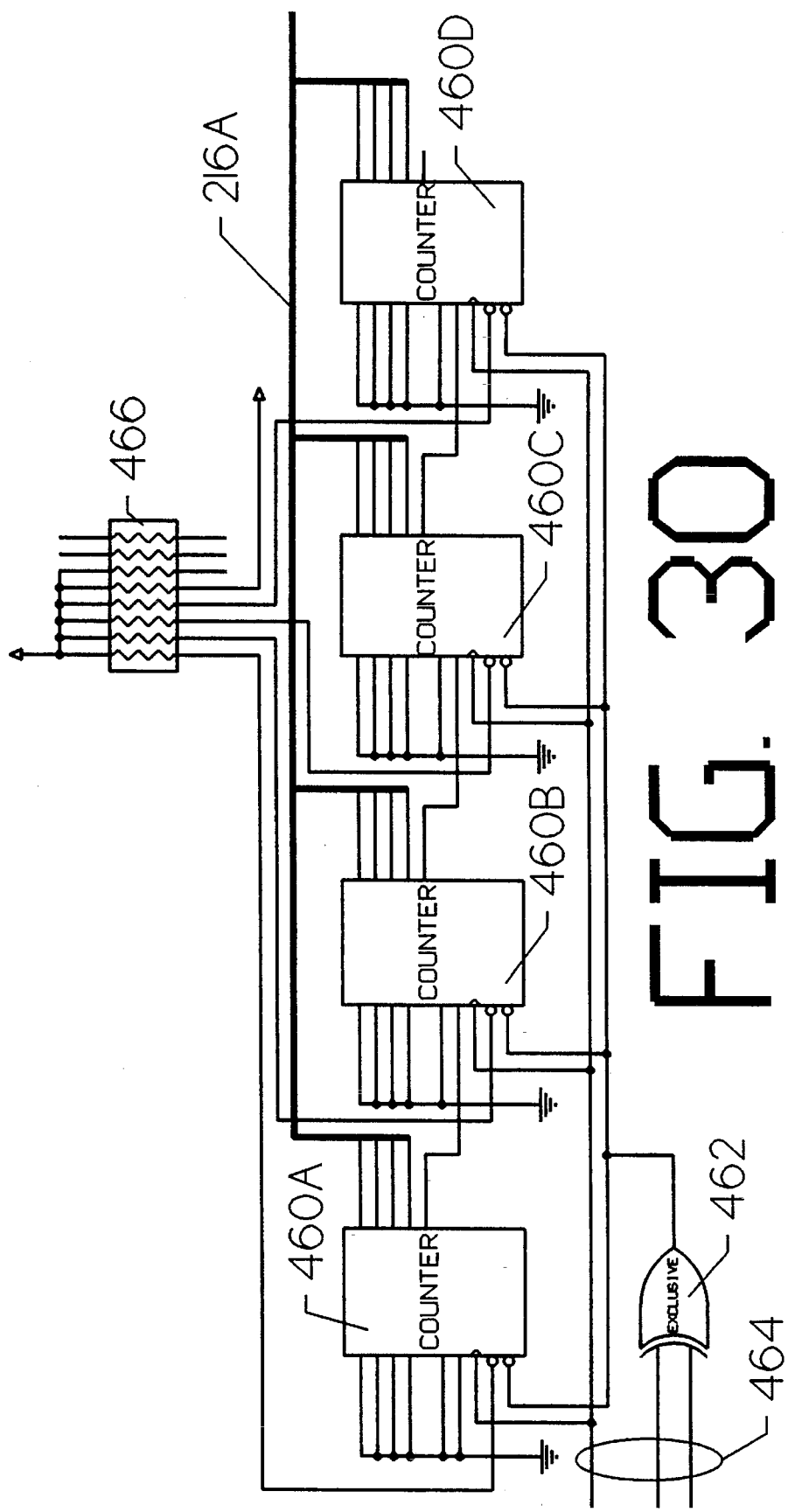
FIG. 30 is a schematic diagram of the SCSI buffer memory address circuit.

FIG. 30 is a schematic diagram of the disk storage subsystem buffer memory addressing generation. Counters 460A, 460B, 460C, and 460D are each a type 74F161 four bit counter. When combined, they can provide the 16 bit address to access dedicated disk storage subsystem buffer memory 222. The load inputs of the latches are pulled up by pull up resistors 466 for non-usage. The counters are cleared by exclusive or 462 upon de-assertion of read or write as determined by control lines 464. The address counter is a 16-bit synchronous counter clocked when buffer data chip select is de-asserted (see also FIG. 27). Thus valid address lines are provided to the buffer memory 222 (see also FIG. 29).

Figure 31:
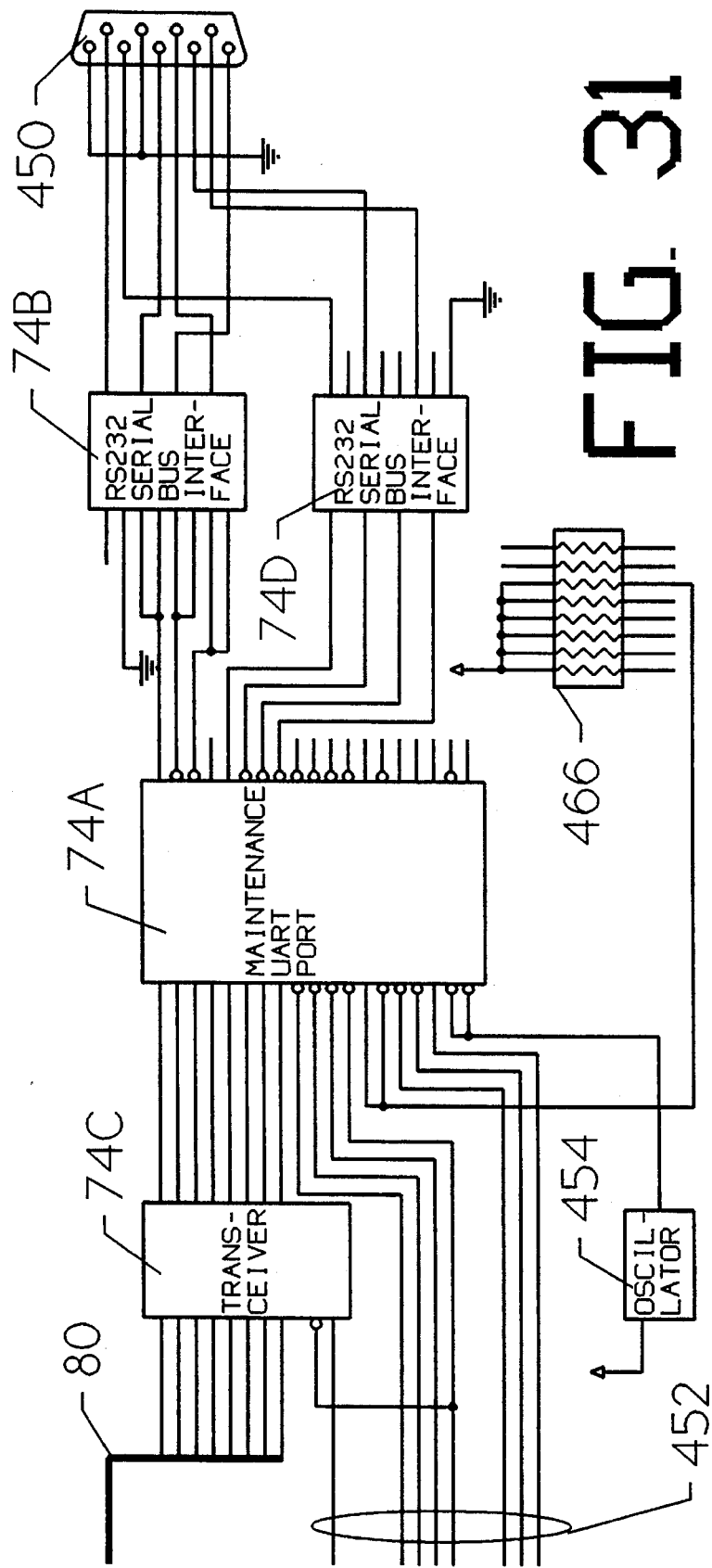
FIG. 31 is a schematic diagram of the maintenance port.

FIG. 31 is a schematic diagram of the maintenance port 74 which provides operator access for testing and fault determination purposes. The eight least significant bits of instruction bus 80 are interfaced at transceiver 74C, which is a type 74F245 semiconductor device. Maintenance UART port 74A is a type AM8530 semiconductor device which interfaces to RISC processor via read/write and port select controls and data signals via lines 452 and 80, respectively. Pull up resistors 466 pull up the unused lines. Type RS232 serial bus interface devices 74B and 74D provide connector 450 with a standardized RS-232 interface. Oscillator 454 provides a 2.4 MHz clock signal to time the serial output.

Figure 32:
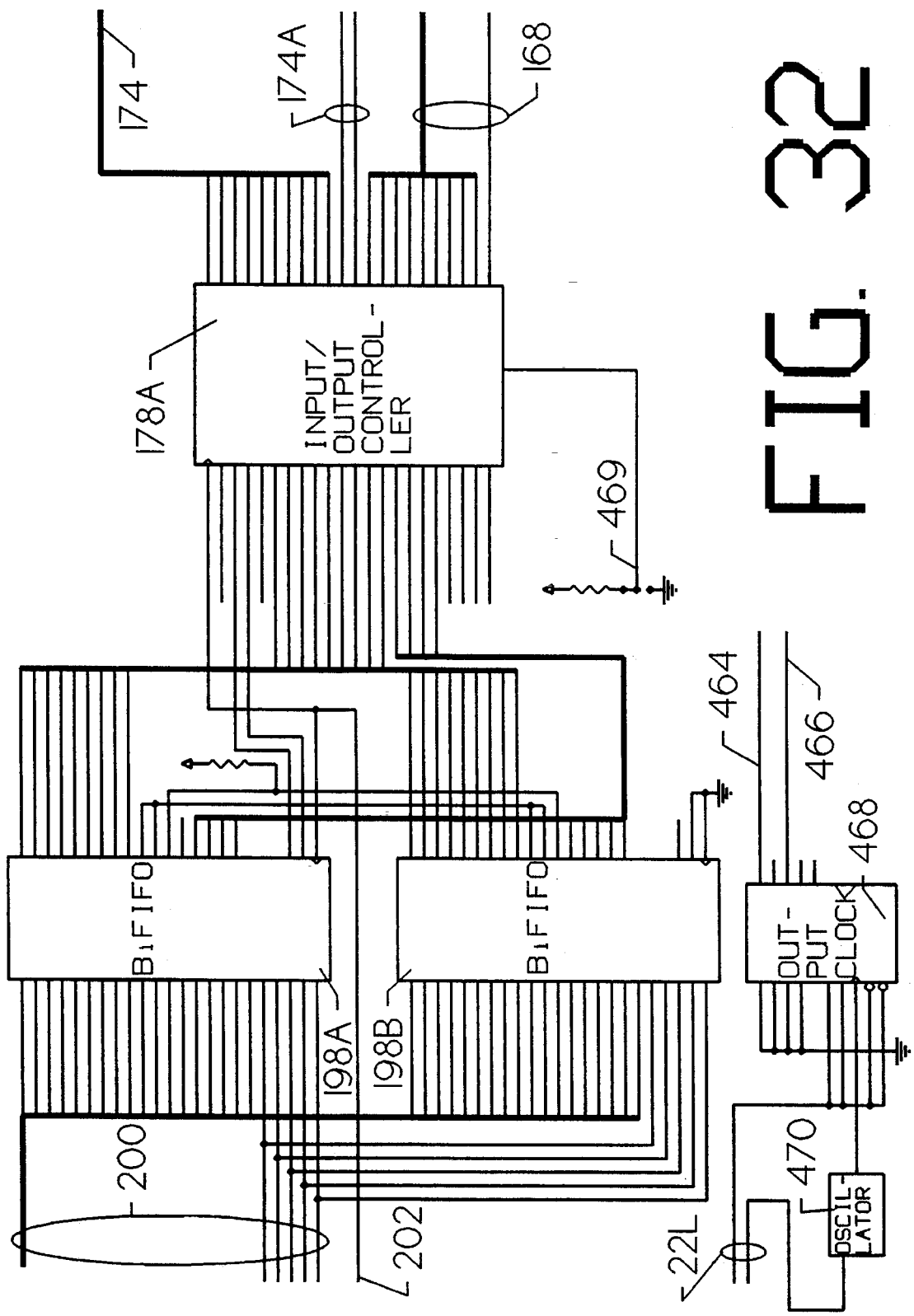
FIG. 32 is a schematic diagram of the BMC FIFO's.

FIG. 32 is a schematic diagram of the BMC input/output controller and associated bi-directional FIFO's. It should be noted that the above identified U.S. patent application, incorporated herein by reference, provides additional description of another embodiment of a BMC interface converted to optical medium.

A data connection with main bus 24, along with the associated direction and timing controls, are provided to the BMC interface at bus 200. Bi-directional BiFIFOs 198A and 198B, each comprising a type IDT7252 2k BiFIFO, convert the data as two 16 bit half words with parity on the device controller side into eight-bit bytes with parity on the BMC port side. The opposite side of bi-directional FIFOs 198A and 198B are shifted under control of the associated control lines to present or receive one byte plus parity to or from input/output controller 178A, which is a Unisys BMC-102 semiconductor device. A byte to be transmitted is output via bus 174. A received byte is transferred via bus 168. Control lines 174 strobe the serialization of the data and specify tag and data bytes to permit frame synchronization.

Manual switch 469 permits the operator to switch between the minimum mode (MIN) and the maximum mode (MAX). As explained above, MIN provides FIFPS60 protocol timing and controls consistent with input/output transmissions of up to 500 feet. MAX provides modified FIFPS60 protocol for transmissions up to 10 kilometers. Timing for the serialized fiber optic transmission and reception is provided by 83.36 MHz oscillator 470. The oscillator output clocks 468, which is a 74F161 semiconductor counter device. The outputs of counter 468 on lines 464 and 466 are synchronous timing signals at 41.68 MHz and 10.42 MHz, respectively. The pull up lines 22 ensure proper five volt termination.

Figure 33:
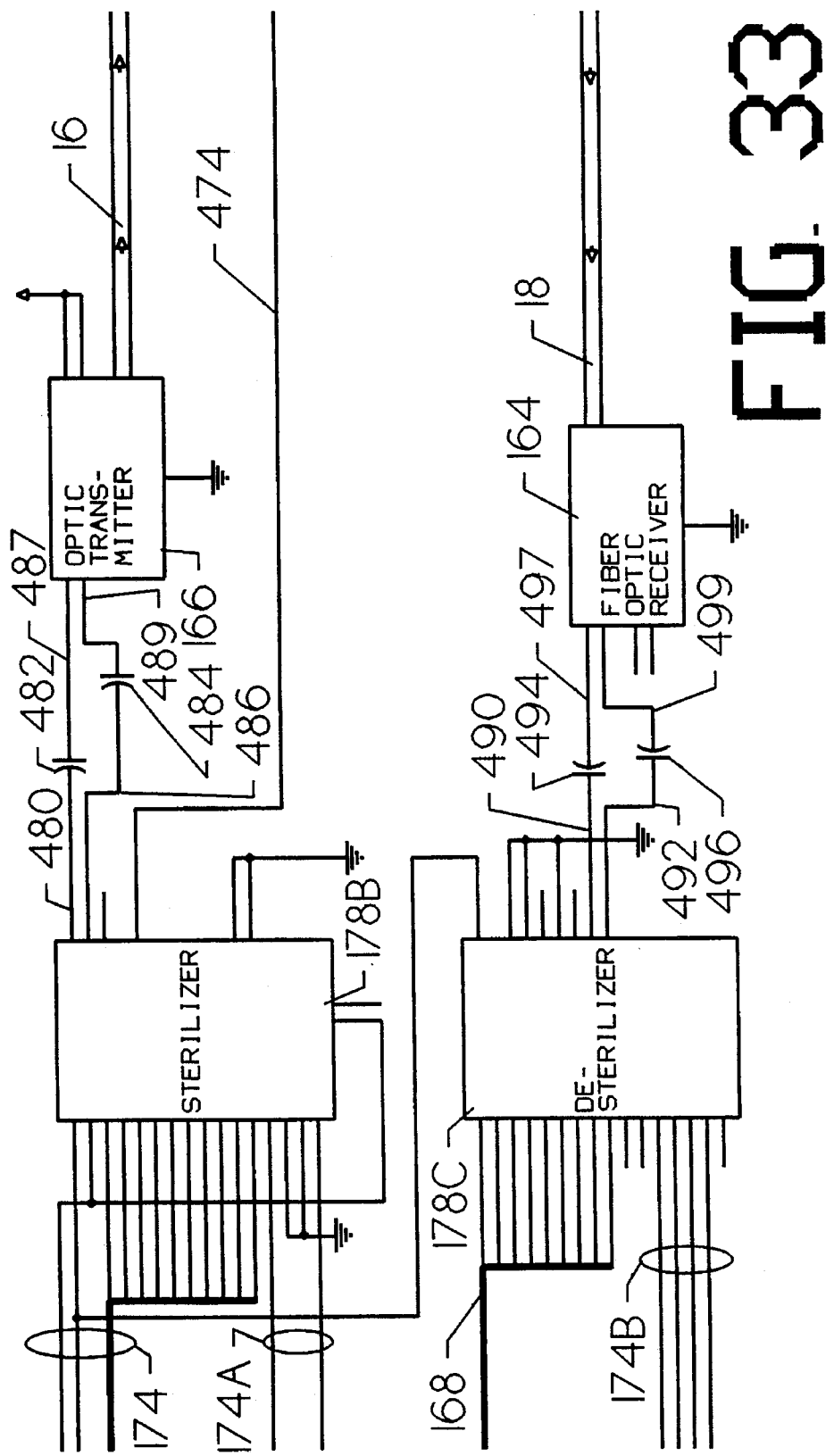
FIG. 33 is a basic diagram of the fiber optic driver/receiver circuit.

FIG. 33 is a schematic diagram of the electrical to optical conversion circuitry for the BMC channel extender fiber optic interface employing long range electrical/optical converters. A byte to be transmitted is received by serializer 178B via bus 174. The byte is serialized and output as a balanced bit stream on lines 480 and 486 under control of control lines 174A, which strobe the serialization process and define whether a given byte is a data byte or a tag byte. Serializer 178B is an AM79168 semiconductor device. The output is capacitively coupled via capacitors 482 and 484 and lines 487 and 489 to fiber optic transmitter 166. The modulated light beam is transferred via fiber optic cable 16.

Similarly, the received modulated light beam is received by fiber optic receiver 164 from fiber optic cable 18. The resultant balanced electrical bit stream is coupled via capacitors 494 and 496 from lines 497 and 499 to lines 490 and 492, respectively. Deserializer 178C, which is an AM79169 semiconductor device, converts the bit stream to parallel bytes and control lines 174B. These control lines strobe the received information and separate tag bytes from data bytes. The assembled bytes are transferred via bus 168.

Figure 34:
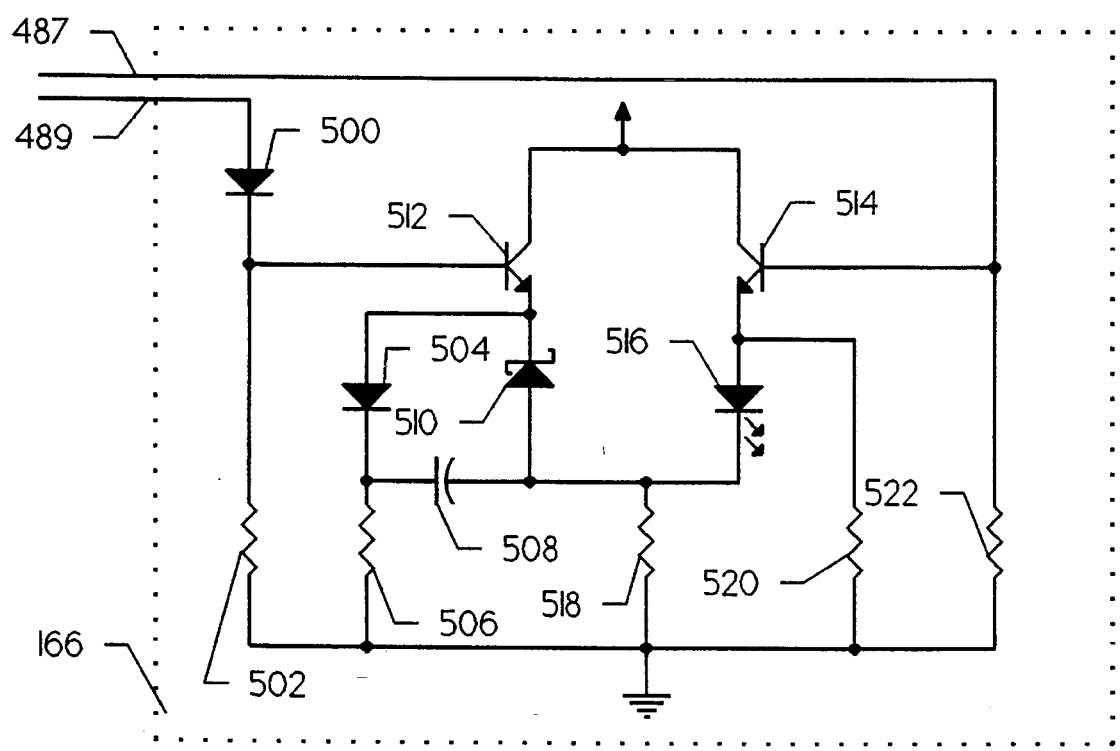
FIG. 34 is a detailed schematic diagram of the fiber optic driver.

FIG. 34 is a detailed schematic diagram of the fiber optic transmitter which converts the balanced serial bit stream into a modulated beam of coherent light for use up to 500 feet (i.e. MIN). The identical circuit is employed by both host computer 12 and device controller 10.

A positive five volts is applied to the collectors of drive transistors 512 and 514, which are type MRF581A. The bases of these transistors are controlled by the opposite polarities of the balanced serial bit stream imposed on lines 487 and 489 as dropped across load resistors 522 and 502, respectively. Diode 500 (type 1N4150) provides reverse current protection. The emitter collector current of transistor 514 drives the type HFRB-1402 light emitting diode 516 to produce the modulated light beam, with resistor 518 limiting the total current.

The emitter of drive transistor 514 is biased above ground by resistor 520. Drive transistor 512 is similarly biased by resistor 506 with type 1N4150 diode 504 providing reverse current protection for the collector emitter circuit. Pulse shaping is provided by zener diode 510 (type 5082–2810) and capacitor 508. Light emitting diode 516 is optically coupled to fiber optic cable 18.

Figure 35:
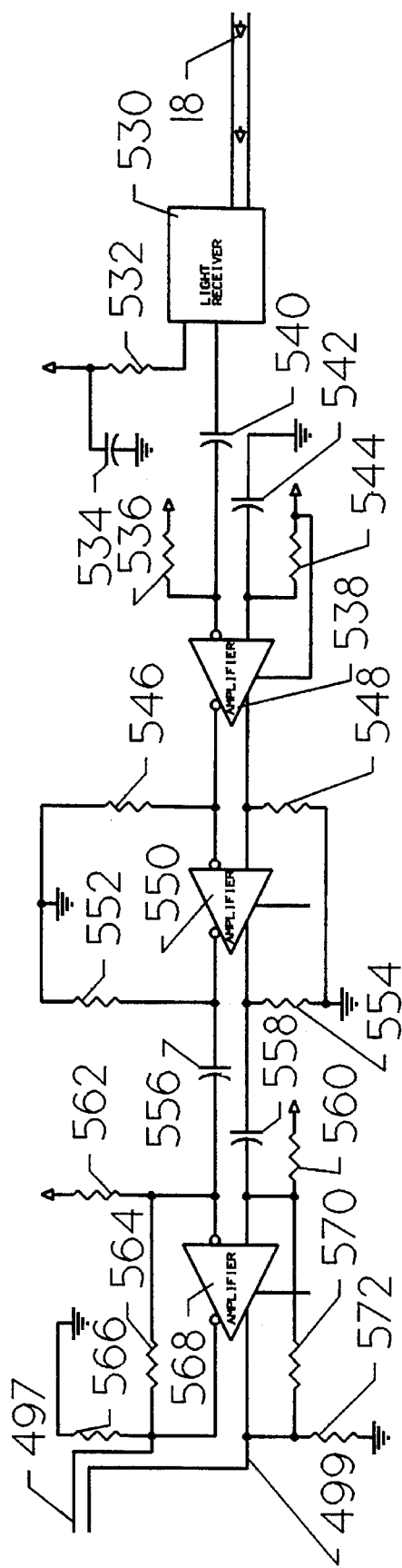
FIG. 35 is a detailed schematic diagram of the fiber optic receiver.

FIG. 35 is a detailed schematic diagram of the fiber optic receiver for MIN mode. As with the fiber optic transmitter circuit, the fiber optic receiver circuit may be identical for both host computer 12 and device controller 10. Conversion from a light beam to an electrical signal is accomplished by type HFBR-2402 light receiver 530. The remaining circuitry amplifies and processes the converted electrical signal.

The receiver enable input of light receiver 530 is pulled up by resistor 532 to the positive five volt supply with capacitor 534 decoupling parasitics. The converted electrical signal is amplified by three stages of amplification by amplifiers 538, 550, and 568 (all type MC10116). The first two stages are direct coupled. Interstage coupling for stages two and three is provided by capacitors 556 and 558. The unbalanced input to the first stage and balanced inputs to the third stage are biased by resistors 544, 536, 562, and 560. The positive and negative sides of the balanced outputs of each stage are biased by resistors 546, 548, 552, 554, 566, and 572. The output of amplifier 568 is the balanced serial bit stream which is processed by the standard digital circuity of device controller 10.

Figure 36:
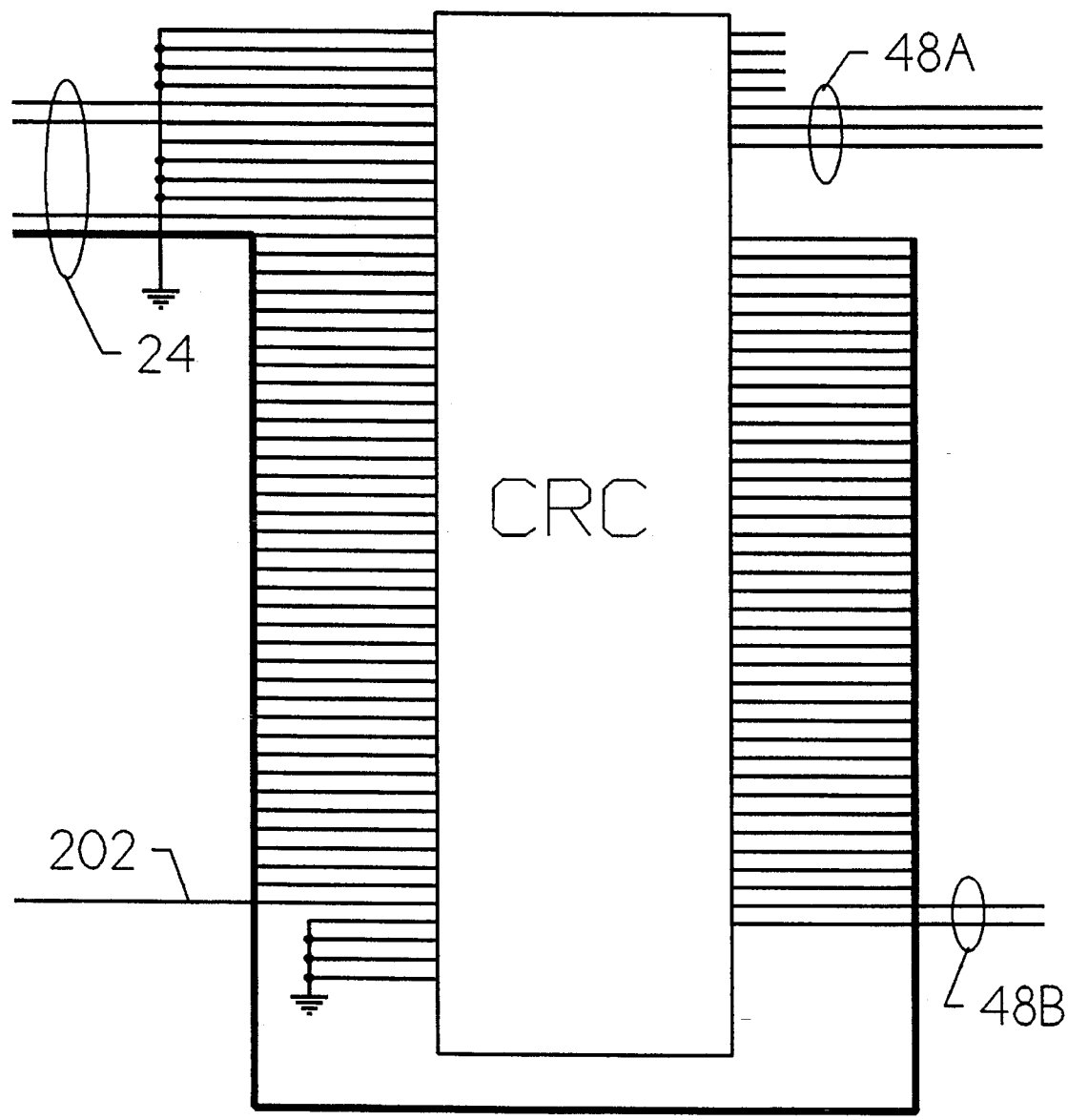
FIG. 36 is a schematic of the CRC logic.

FIG. 36 is a schematic diagram for the cyclic redundancy code logic (CRC) employed with the BMC interface. Use of the CRC greatly improves data transmission reliability and is deemed to render extended distance transmissions at least as reliable as shorter distance transmissions without CRC. A standard type S2023 semiconductor device is utilized. The S2023 device is placed parallel to BIFIFO 56. During the data transmission phase, the device is used as a CRC generator. At the completion of a block transmission, the generated CRC is sent to the host BMC (see also FIG. 32) by asserting CRC_RD. During the data reception phase, a similar device (i.e. S2023) is used as a CRC checker. When an entire block of data has been received, the generated CRC is checked against the received CRC. Any CRC ERROR produced during the reception phase or at the end of reception phase is reported to the RISC processor via lines 48B and 48A. In addition to CRC generation and checking, this device is enabled for parity checking.

Having thus described the preferred embodiments of the present invention, those of skill, in the art will be readily able to practice the present invention using yet other embodiments within the scope of the claims herein presented.

I claim:

1. An apparatus comprising:
   a. a host computer, at least a portion of said host computer operating in accordance with a first predetermined parallel electrical communication protocol;
   b. a peripheral device, at least a portion of said peripheral device operating in accordance with a second predetermined parallel electrical communication protocol;
   c. a device controller coupled to said portion of said peripheral device that operates in accordance with said second predetermined parallel electrical communication protocol via a cable and wherein said device controller is located at a variable distance from said host computer of up to 10 kilometers;
   d. a fiber optic input/output link coupled to said portion of said host computer that operates in accordance with said first predetermined parallel electrical communication protocol and further coupled to said device controller, said fiber optic input/output link having a length that substantially matches said variable distance from said host computer to said device controller and operates in accordance with a predetermined serial optical communication protocol;
   e. first interfacing means coupled to said host computer and further coupled to said fiber optic input/output link for interfacing between said first predetermined parallel electrical communication protocol and said serial optical communication protocol;

f. second interfacing means coupled to said device controller and further coupled to said fiber optic input/ output link for interfacing between said second predetermined parallel electrical communication protocol and said serial optical communication protocol; and g. at least one of said first and second interfacing means further including means for accommodating said variable distance such that said operation of said host computer is independent of said variable distance, said means for accommodating including a buffering means.

2. An apparatus according to claim 1 wherein said first predetermined parallel electrical communication protocol is compatible with an existing electrical interface.

3. An apparatus according to claim 2 wherein said existing electrical interface comprises the Block Multiplexer Channel protocol.

4. An apparatus according to claim 2 wherein said existing electrical interface comprises the ESCON protocol.

5. An apparatus according to claim 1 or 2 or 3 or 4 wherein said device controller further comprises:

a. an additional interface which may be coupled to an additional peripheral device via an additional cable.

6. An apparatus according to claim 5 wherein said additional interface is compatible with Futurebus+.

7. An apparatus according to claim 6 wherein said device controller further comprises an embedded Reduced Instruction Set Computer.

8. An apparatus according to claim 7 wherein said device controller further comprises a disk storage subsystem.

9. An apparatus according to claim 8 wherein said device controller further comprises:

a. means for transferring data directly between said disk storage subsystem and said Futurebus+ interface.

10. An apparatus according to claim 1 wherein said second predetermined parallel electrical communication protocol is compatible with an existing electrical interface.

11. An apparatus according to claim 10 wherein said existing electrical interface comprises the Block Multiplexer Channel protocol.

12. An apparatus according to claim 10 wherein said existing electrical interface comprises the ESCON protocol.

13. An apparatus for transferring data between a host computer having a Block Multiplexer Channel interface and a plurality of peripheral devices located at a distance of up to 10 kilometers therefrom comprising:

a. a device controller having a communication interface which is compatible with the Block Multiplexer Channel interface and further having a plurality of peripheral device interfaces coupled to the plurality of peripheral devices via the plurality of peripheral device interfaces;

b. a fiber optic medium coupling the host computer Block Multiplexer Channel interface to the device controller communication interface; and c. a memory device located within said device controller for buffering the transferred data to the plurality of peripheral devices.

14. An apparatus for transferring data between a host computer having an electrical interface and a plurality of peripheral devices located at a distance of up to 10 kilometers therefrom comprising:

a. a device controller having a Block Multiplexer Channel interface which is compatible with the electrical interface and further having a plurality of peripheral device interfaces coupled to the plurality of peripheral devices via the plurality of peripheral device interfaces;

b. a fiber optic medium coupling the host computer electrical interface to the device controller Block Multiplexer Channel interface; and c. a memory device located within said device controller for buffering the transferred data to the plurality of peripheral devices.

15. An apparatus for transferring data between a host computer having an ESCON interface and a plurality of peripheral devices located at a distance of up to 10 kilometers therefrom comprising:

a. a device controller having a communication interface which is compatible with the ESCON interface and further having a plurality of peripheral device interfaces coupled to the plurality of peripheral devices via the plurality of peripheral device interfaces;

b. a fiber optic medium coupling the host computer ESCON interface to the device controller communication interface; and c. a memory device located within said device controller for buffering the transferred data to the plurality of peripheral devices.

16. An apparatus for transferring data between a host computer having an electrical interface and a plurality of peripheral devices located at a distance of up to 10 kilometers therefrom comprising:

a. a device controller having an ESCON interface which is compatible with the electrical interface and further having a plurality of peripheral device interfaces coupled to the plurality of peripheral devices via the plurality of peripheral device interfaces;

b. a fiber optic medium coupling the host computer electrical interface to the device controller ESCON interface; and c. a memory device located within said device controller for buffering the transferred data to the plurality of peripheral devices.

17. An apparatus for transferring data between a host computer having an electrical interface and a plurality of peripheral devices located at a distance of up to 10 kilometers therefrom comprising:

a. a device controller having a communication interface which is compatible with the electrical interface, at least one of a plurality of peripheral device interfaces coupled to at least one of the plurality of peripheral devices via at least one of the plurality of peripheral device interfaces, at least another of the plurality of peripheral device interfaces coupled to at least another of the plurality of peripheral devices via at least one of a plurality of FUTUREBUS+ interfaces;

b. a fiber optic medium coupling the host computer electrical interface to the device controller communication interface; and c. a memory device located within said device controller for buffering the transferred data to the host computer.

18. An apparatus for transferring data between a host computer having a Block Multiplexer Channel interface and a plurality of peripheral devices located at a distance of up to 10 kilometers therefrom comprising:

a. a device controller having a communication interface which is compatible with the Block Multiplexer Channel interface and further having a plurality of peripheral device interfaces coupled to the plurality of peripheral devices via the plurality of peripheral device interfaces;

b. a fiber optic medium coupling the host computer Block Multiplexer Channel interface to the device controller communication interface; and c. a memory device located within said device controller for buffering the transferred data to the host computer.

19. An apparatus for transferring data between a host computer having an electrical interface and a plurality of peripheral devices located at a distance of up to 10 kilometers therefrom comprising:

a. a device controller having a Block Multiplexer Channel interface which is compatible with the electrical interface and further having a plurality of peripheral device interfaces coupled to the plurality of peripheral devices via the plurality of peripheral device interfaces;

b. a fiber optic medium coupling the host computer electrical interface to the device controller Block Multiplexer Channel interface; and c. a memory device located within said device controller for buffering the transferred data to the host computer.

20. An apparatus for transferring data between a host computer having an ESCON interface and a plurality of peripheral devices located at a distance of up to 10 kilometers therefrom comprising:

a. a device controller having a communication interface which is compatible with the ESCON interface and further having a plurality of peripheral device interfaces coupled to the plurality of peripheral devices via the plurality of peripheral device interfaces;

b. a fiber optic medium coupling the host computer ESCON interface to the device controller communication interface; and c. a memory device located within said device controller for buffering the transferred data to the host computer.

21. An apparatus for transferring data between a host computer having an electrical interface and a plurality of peripheral devices located at a distance of up to 10 kilometers therefrom comprising:

a. a device controller having an ESCON interface which is compatible with the electrical interface and further having a plurality of peripheral device interfaces coupled to the plurality of peripheral devices via the plurality of peripheral device interfaces;

b. a fiber optic medium coupling the host computer electrical interface to the device controller ESCON interface; and c. a memory device located within said device controller for buffering the transferred data to the host computer.

22. An apparatus according to claims 13, 14, 15, 16, 17, 18, 19, 20 or 21 where said memory device is contained within a Reduced Instruction Set Computer.

23. An apparatus for transferring data between a host computer having an electrical interface and a plurality of peripheral devices located at a distance of up to 10 kilometers therefrom comprising:

a. a host converter having a fiber optic interface, the host converter is coupled to the electrical interface of the host computer and converts the data from an electrical representation to an optical representation;

b. a device controller having a plurality of peripheral device interfaces, the device controller is coupled to the plurality of peripheral devices via the plurality of peripheral device interfaces;

c. a controller converter having a fiber optic interface, the controller converter is coupled to the device controller and converts the data from an optical representation to an electrical representation;

d. a controller memory device coupled to the controller converter and further coupled to the plurality of peripheral device interfaces for buffering the transferred data to the peripheral devices;

e. a fiber optic medium coupling the fiber optic interface of the host converter to the fiber optic interface of the controller converter; and f. a protocol controller coupled to the controller converter and further coupled to the controller memory device for controlling the protocol used during the data transfer.

24. An apparatus according to claim 23 wherein the protocol controller provides a FIFPS60 protocol.

25. An apparatus according to claim 23 wherein the protocol controller provides a modified FIFPS60 protocol.

26. An apparatus for transferring data between a host computer having an electrical interface and a plurality of peripheral devices located at a distance of up to 10 kilometers therefrom comprising:

a. a host converter having a fiber optic interface, the host converter is coupled to the electrical interface of the host computer and converts the data from an optical representation to an electrical representation;

b. a device controller having a plurality of peripheral device interfaces, the device controller is coupled to the plurality of peripheral devices via the plurality of peripheral device interfaces;

c. a controller converter having a fiber optic interface, the controller converter is coupled to the device controller and converts the data from an electrical representation to an optical representation;

d. a controller memory device coupled to the controller converter and further coupled to the plurality of peripheral device interfaces for buffering the transferred data from the peripheral devices;

e. a fiber optic medium coupling the fiber optic interface of the host converter to the fiber optic interface of the controller converter; and f. a protocol controller coupled to the controller converter and further coupled to the controller memory device for controlling the protocol used during the data transfer.

27. An apparatus according to claim 26 wherein the protocol controller provides a FIFPS60 protocol.

28. An apparatus according to claim 26 wherein the protocol controller provides a modified FIFPS60 protocol.

* * * * *